US009093844B2

(12) United States Patent
Yonezawa et al.

(10) Patent No.: US 9,093,844 B2
(45) Date of Patent: Jul. 28, 2015

(54) CHARGE/DISCHARGE SCHEDULING SYSTEM AND CHARGE/DISCHARGE SCHEDULING METHOD

(71) Applicants: Minoru Yonezawa, Tokyo (JP); Toru Ezawa, Kawasaki (JP); Hideyuki Aisu, Kawasaki (JP)

(72) Inventors: Minoru Yonezawa, Tokyo (JP); Toru Ezawa, Kawasaki (JP); Hideyuki Aisu, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 375 days.

(21) Appl. No.: 13/676,524

(22) Filed: Nov. 14, 2012

(65) Prior Publication Data

US 2013/0119939 A1 May 16, 2013

(30) Foreign Application Priority Data

Nov. 15, 2011 (JP) ................................ 2011-250059

(51) Int. Cl.
*H01M 10/44* (2006.01)
*H01M 10/46* (2006.01)
*H02J 7/00* (2006.01)

(52) U.S. Cl.
CPC ................. *H02J 7/00* (2013.01); *H02J 7/0073* (2013.01); *H02J 7/0091* (2013.01)

(58) Field of Classification Search
CPC ....... H02J 7/082; H02J 7/0078; H02J 7/0047; H02J 7/0091; H02J 7/0073; H02J 7/0093
USPC ................. 320/107, 130, 133, 134, 136, 150; 324/426, 427, 430, 433
See application file for complete search history.

(56) References Cited

U.S. PATENT DOCUMENTS 8,332,342 B1 * 12/2012 Saha et al. ...................... 706/45
2010/0318252 A1 * 12/2010 Izumi ........................... 320/109

FOREIGN PATENT DOCUMENTS

JP 8-98426 A 4/1996
JP 8-140285 A 5/1996
JP 8-317559 A 11/1996

(Continued)

OTHER PUBLICATIONS

Japanese Office Action issued Oct. 24, 2014 in Patent Application No. 2011-250059 (with English Translation).

(Continued)

*Primary Examiner* — Edward Tso
(74) *Attorney, Agent, or Firm* — Oblon, McClelland, Maier & Neustadt, L.L.P.

(57) ABSTRACT

There is provided a charge/discharge scheduling system in which a measurer measures temperature of a battery unit, a current/voltage measurer measures a voltage and a current at the battery unit, an estimating unit estimates an internal resistance of the battery unit, a scheduler creates, based on a charge/discharge instruction specifying charge amount or discharge amount, a charging schedule or a discharging schedule for the battery unit, a temperature estimating unit estimates time-transition of temperature of the battery unit, based on the internal resistance of the battery unit, the load estimator estimates a load amount applied to the battery unit based on the temperature time-transition of the battery unit provided that the charging schedule or the discharging schedule is carried out, the charge/discharge scheduler creates the charge schedule or the discharge schedule so that the load amount applied to the battery unit is a minimum or smaller than a threshold value.

13 Claims, 21 Drawing Sheets

(56) References Cited

FOREIGN PATENT DOCUMENTS

| | | | |
|---|---|---|---|
| JP | 2001-211548 | A | 8/2001 |
| JP | 2007-50888 | A | 3/2007 |
| JP | 2008-24124 | A | 2/2008 |
| JP | 2009-22061 | A | 1/2009 |
| JP | 2010-249770 | | 11/2010 |

OTHER PUBLICATIONS

Office Action issued Jan. 16, 2015 in Japanese Patent Application No. 2011-250059 (with English translation).

* cited by examiner

| BATTERY UNIT INTERNAL TEMPERATURE RANGE | LOAD INDEX PER UNIT TIME |
|---|---|
| TEMPERATURE RANGE 1:60℃ OR MORE | L1:81 |
| TEMPERATURE RANGE 2:50℃~60℃ | L2:27 |
| TEMPERATURE RANGE 3:40℃~50℃ | L3:9 |
| TEMPERATURE RANGE 4:30℃~40℃ | L4:3 |
| TEMPERATURE RANGE 5:5℃~30℃ | L5:1 |
| TEMPERATURE RANGE 6:5℃ OR LESS | L6:27 |

FIG. 5

| BATTERY UNIT INTERNAL TEMPERATURE RANGE AT SOC:20%-80% | LOAD INDEX PER UNIT TIME |
|---|---|
| TEMPERATURE RANGE 1:60℃ OR MORE | L1:81 |
| TEMPERATURE RANGE 2:50℃~60℃ | L2:27 |
| TEMPERATURE RANGE 3:40℃~50℃ | L3:9 |
| TEMPERATURE RANGE 4:30℃~40℃ | L4:3 |
| TEMPERATURE RANGE 5:5℃~30℃ | L5:1 |
| TEMPERATURE RANGE 6:5℃ OR LESS | L6:27 |

| BATTERY UNIT INTERNAL TEMPERATURE RANGE AT SOC:20% OR LESS, 80% OR MORE | LOAD INDEX PER UNIT TIME (3 TIMES FOR DISCHARGE OF 20% OR LESS, CHARGE OF 80% OR MORE) |
|---|---|
| TEMPERATURE RANGE 1:60℃ OR MORE | L1:729 |
| TEMPERATURE RANGE 2:50℃~60℃ | L2:243 |
| TEMPERATURE RANGE 3:40℃~50℃ | L3:81 |
| TEMPERATURE RANGE 4:30℃~40℃ | L2:27 |
| TEMPERATURE RANGE 5:5℃~30℃ | L5:9 |
| TEMPERATURE RANGE 6:5℃ OR LESS | L6:243 |

FIG. 9

CHARGE/DISCHARGE SCHEDULING SYSTEM AND CHARGE/DISCHARGE SCHEDULING METHOD

CROSS REFERENCE TO RELATED APPLICATIONS

This application is based upon and claims the benefit of priority from the prior Japanese Patent Application No. 2011-250059, filed on Nov. 15, 2011, the entire contents of which are incorporated herein by reference.

FIELD

Embodiments described herein relates to a charge/discharge scheduling system and a charge/discharge scheduling method which performs charge scheduling or discharge scheduling of a battery unit, and for example, the embodiments relate to a charge/discharge scheduling method and a charge/discharge scheduling system which performs charge scheduling or discharge scheduling to minimize deterioration of a battery unit during charging or discharging the battery.

BACKGROUND

Conventionally, battery units are charged or discharged in a fixed charge/discharge pattern without caring about the deterioration of the battery units. This causes a problem that the temperature largely increases inside a battery unit resulting in a deterioration of the battery unit.

Also, in the case of battery units for automobile, it is needed to instantaneously discharge a required amount. While in many cases of stationary battery units and the like, a predetermined period of time is allowed to carry out the charge/discharge. In these cases, a charge/discharge schedule is required to carry out the charge/discharge while inhibiting the deterioration of battery units.

It is known that when battery units repeat the charge/discharge, the internal resistance thereof gradually increases while the charge/discharge capacity decreases. The increase of the internal resistance depends on the duration of time; i.e. how long a battery unit itself or battery cells themselves are placed under a high temperature condition. That is, in battery units which are placed under a high temperature condition for a long period of time, the internal resistance increases while the deterioration of the battery units is accelerated.

BRIEF DESCRIPTION OF THE DRAWINGS

FIG. 5 is a diagram showing an example of a load index table according to the first embodiment;

FIG. 9 is a diagram showing an example of a load index table in which SOC and internal estimated temperature are considered;

DETAILED DESCRIPTION

Figure 1:
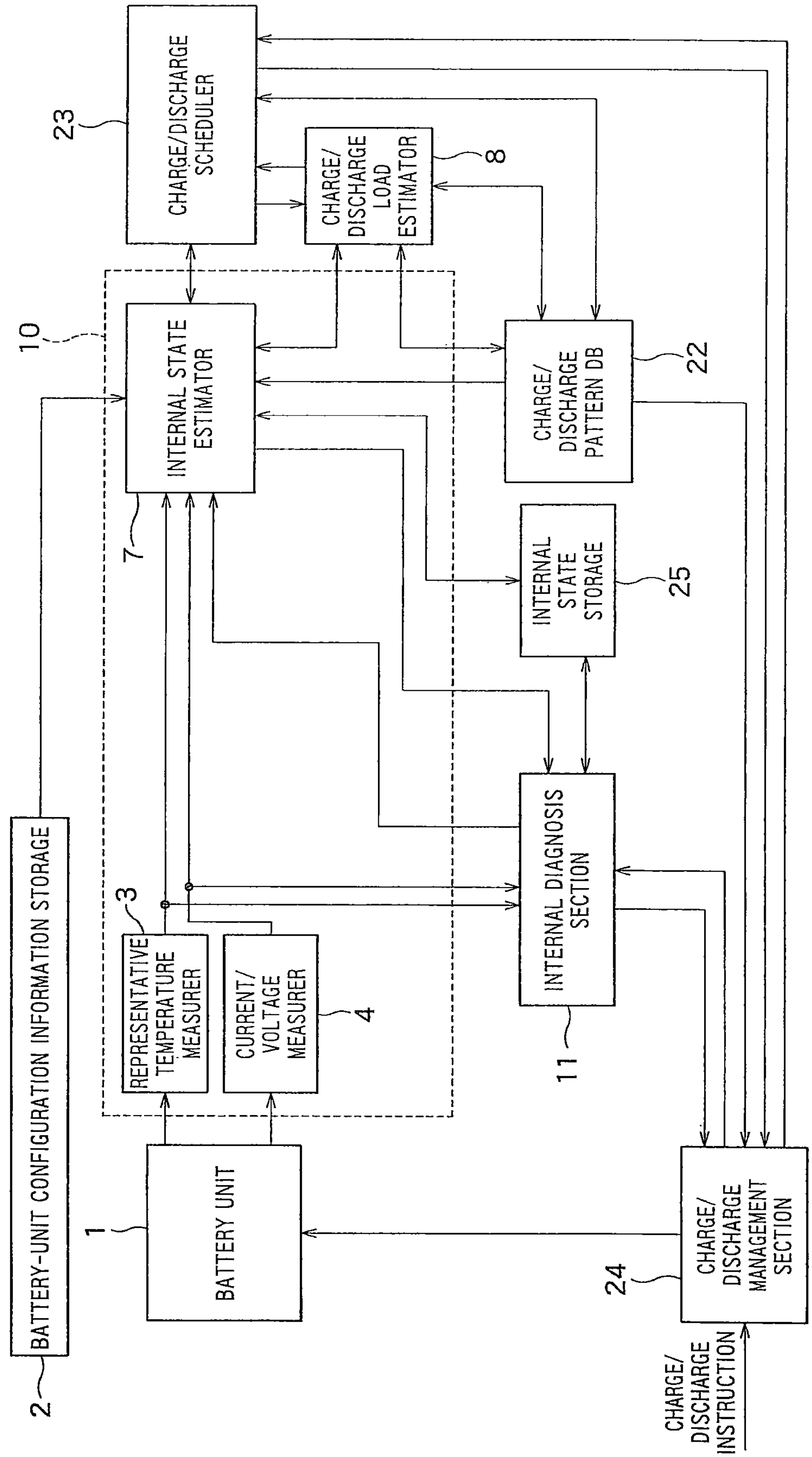
FIG. 1 is a diagram showing a configuration of a charge/discharge scheduling system according to a first embodiment.

According to some embodiments, there is provided a charge/discharge scheduling system, including: a temperature measurer, a current/voltage measurer, an internal resistance estimating unit, a charge/discharge scheduler, a temperature estimating unit and a load estimator.

The temperature measurer measures temperature of a battery unit.

The current/voltage measurer measures a voltage and a current at the battery unit.

The internal resistance estimating unit estimates an internal resistance of the battery unit.

The charge/discharge scheduler creates, based on a charge/discharge instruction specifying charge amount or discharge amount, a charging schedule for charging the battery unit with power of the charge amount or a discharging schedule for discharging power of the discharge amount from the battery unit.

The temperature estimating unit estimates time-transition of temperature of the battery unit based on the internal resistance of the battery unit provided that the charge schedule or discharge schedule is carried out.

The load estimator estimates a load amount applied to the battery unit based on the temperature time-transition of the battery unit provided that the charging schedule or the discharging schedule is carried out.

The charge/discharge scheduler creates the charge schedule or the discharge schedule so that the load amount applied to the battery unit is a minimum or smaller than a threshold value.

Embodiments will be described below referring to the drawings.

FIG. 1 shows a configuration of a charge/discharge scheduling system according to a first embodiment.

The charge/discharge scheduling system shown in FIG. 1 includes a battery unit 1, a battery-unit configuration information storage 2, a charge/discharge load estimator 8, a battery-unit internal state monitor/estimator 10, an internal diagnosis section 11, an internal state storage 25, a charge/discharge pattern DB 22, a charge/discharge scheduler 23 and a charge/discharge management section 24. The battery-unit internal state monitor/estimator 10 includes a representative temperature measurer 3, a current/voltage measurer 4 and an internal state estimator 7. The battery unit 1 may be provided outside the system.

The present embodiment is applicable to, for example, charge scheduling or discharge scheduling (hereinafter, referred to as charge/discharge schedules) in a system which performs charging or discharging (hereinafter, referred to as charge/discharge) in a relatively long period of time based on a specified charge or discharge amount (hereinafter, referred to as charge/discharge amount). For example, the embodiment may be used for charge/discharge scheduling of charging a battery unit which keeps a controlled power in a power grid, discharging a battery unit which is provided in an EV plug-in station and charging a battery unit in an EV during night, etc. The battery unit 1 may be a lithium-ion battery or a battery unit constituted of other materials.

Receiving a charge/discharge instruction including a piece of information on charge/discharge amount from the outside, the charge/discharge management section 24 obtains a piece of SOC (State Of Charge) information from the internal state estimator 7 and determines the charge/discharge amount so as to satisfy a capacity limitation of the battery unit. The charge/discharge instruction may include a piece of information on a time limit of the charge/discharge such as a time limit to complete the charge/discharge.

For example, assuming that the lower limit of the capacity of the battery unit is 20%; the upper limit thereof is 80% and the present SOC is 50%, the charge is performed as described below. That is, in the case of charge, the SOC after charge is estimated; when the estimated value is 80% or less of the capacity, the charge amount indicated by the instruction is determined; and when the estimated value exceeds 80%, the charge amount is determined so as to be 80% or less. The discharge is also performed in the same manner. That is, the discharge amount is determined so that the SOC after discharge is not less than 20%.

After determining the charge/discharge amount, the charge/discharge management section 24 notifies the charge/discharge scheduler 23 of the determined charge/discharge amount and sends a charge/discharge scheduling instruction to select a charge pattern or discharge pattern (hereinafter, referred to as charge/discharge pattern). Receiving the notification of the charge/discharge pattern selected by the charge/discharge scheduler 23, the charge/discharge management section 24 reads the information on the charge/discharge pattern from the charge/discharge pattern DB 22 to control the charge/discharge of the battery unit 1 based on the read charge/discharge pattern. In the case of charge, the power is obtained from an external supply source to charge the battery unit 1. In the case of discharge, the power is output to an external load or an external battery unit from the battery unit 1.

The charge/discharge scheduler 23 selects a charge/discharge pattern which is used for charging/discharging the battery unit 1 from the charge/discharge pattern DB 22. For this purpose, the charge/discharge scheduler 23 sequentially specifies charge/discharge patterns in the charge/discharge pattern DB 22 first. Then, the charge/discharge load estimator 8 calculates the load on the battery unit 1 if the charge/discharge were made in the specified charge/discharge pattern. Another method, which will be described below, may be employed. That is, a charge/discharge pattern is generated for each minimum schedule time, and the load of the battery unit 1 is calculated. And the internal temperature after the minimum schedule time has elapsed is estimated to thereby generate a charge/discharge pattern for the next minimum schedule time. By repeating the above operation until the previously determined charge/discharge amount is satisfied; thereby the load on the battery unit 1 is added (or accumulated).

The charge/discharge load estimator 8 reads the charge/discharge pattern which is specified by the charge/discharge scheduler 23 from the charge/discharge pattern DB 22 to obtain a piece of information on the internal state (internal resistance, SOC, temperature, etc.) of the battery unit 1 from the internal state estimator 7. The charge/discharge load estimator 8 calculates the load amount which is given to the battery unit 1 by the charge/discharge of the charge/discharge pattern and notifies the charge/discharge scheduler 23 of the load amount.

The charge/discharge scheduler 23 selects the charge/discharge patterns which have a minimum load amount or a load amount smaller than a threshold value while considering the load amount for each charge/discharge pattern calculated by the charge/discharge load estimator 8 and notifies the charge/discharge management section 24 of the selected charge/discharge pattern.

The internal state estimator 7 obtains the temperature of the battery unit 1 from the representative temperature measurer 3, and obtains the current and the voltage at the battery unit 1 from the current/voltage measurer 4 and obtains a piece of basic information (characteristic information) of the battery unit 1 from the battery-unit configuration information storage 2. The internal state estimator 7 performs a calculation using the obtained data to estimate the internal state (internal resistance, SOC, temperature, etc.) of the battery unit 1, and stores the estimated internal state (internal resistance, SOC, temperature, etc.) in the internal state storage 25.

When receiving an inquiry for the internal state from the charge/discharge load estimator 8, the internal state estimator 7 may perform the above estimation and notify of the estimated internal state. Or when the internal state storage 25 has a piece of information of a latest internal state which is previously estimated, the internal state estimator 7 may notify of the latest internal state as a piece of estimation information. Or when the internal state storage 25 has a piece of information of a latest internal state which is previously estimated, the internal state estimator 7 may calculate based on the internal state to estimate the present internal state.

The internal diagnosis section 11 obtains the temperature, the current and the voltage of the battery unit 1 from the representative temperature measurer 3 and the current/voltage measurer 4, and when a large change (for example, a change larger than a threshold value) is found in at least either one of the above, the internal diagnosis section 11 provides an instruction to carry out an internal state estimation to the internal state estimator 7. When the charge/discharge of the battery unit 1 is necessary for this internal state estimation, the internal diagnosis section 11 notifies the charge/discharge management section 24 of the request to perform the charge/discharge and estimates the internal state.

Figure 2:
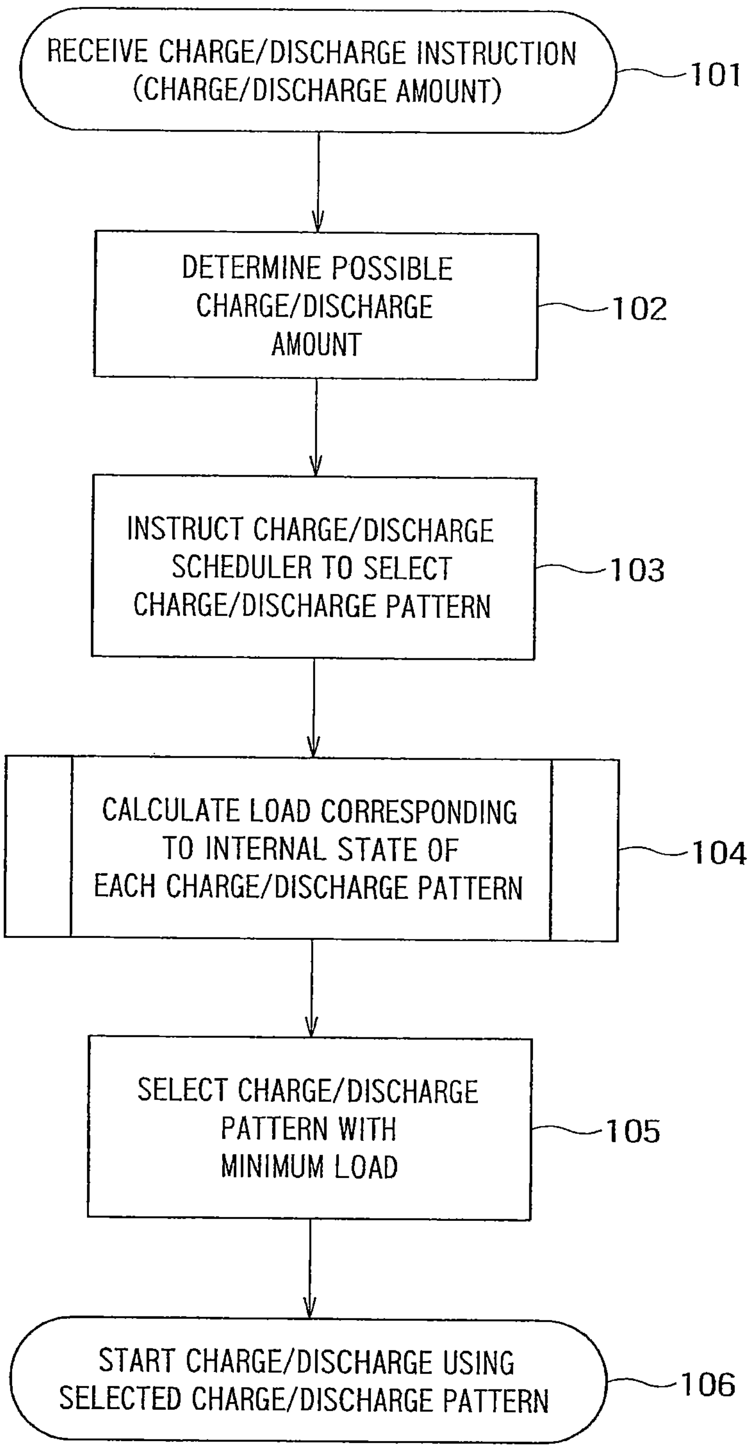
FIG. 2 is a diagram showing an example of a processing flow according to the first embodiment.

FIG. 2 illustrates an example of a processing flow in the system shown in FIG. 1.

First of all, receiving the outside charge/discharge instruction (step 101), the charge/discharge management section 24 obtains a piece of information on the SOC (state of charge) from the internal state estimator 7 to determine the charge/discharge amount (step 102). Subsequently, the charge/discharge management section 24 provides an instruction to select the charge/discharge pattern for performing the charge/discharge the determined charge/discharge amount to the charge/discharge scheduler 23 (step 103).

The charge/discharge scheduler 23 sequentially specifies a plurality of charge/discharge patterns from the charge/discharge pattern DB 22 and provides an instruction to calculate the load amount given to the battery unit 1 if the charge/discharge were made in the specified charge/discharge pattern to the charge/discharge load estimator 8 (step 104). The charge/discharge load estimator 8 calculates the load amount in the charge/discharge pattern by using the information on the internal state estimated by the internal state estimator 7 (step 104).

After calculating the load amount given to the battery unit 1 by each charge/discharge pattern, the charge/discharge scheduler 23 selects a charge/discharge pattern with a minimum load amount (step 105) and notifies the charge/discharge management section 24 of the charge/discharge pattern. The charge/discharge management section 24 starts the charge/discharge using the selected charge/discharge pattern (step 106). It may be configured so that, during sequential calculation of the load amount in each charge/discharge pattern, the charge/discharge pattern may be selected at a point when the charge/discharge pattern for the load amount with the threshold value or less is obtained, the calculation of the load amount in the remaining charge/discharge patterns may be omitted. Or when the calculation time is previously limited, a pattern of a minimum load amount may be selected from the charge/discharge patterns in which the load amount is calculated within a limited period of time.

<Operation of the Internal State Estimator>

Figure 3:
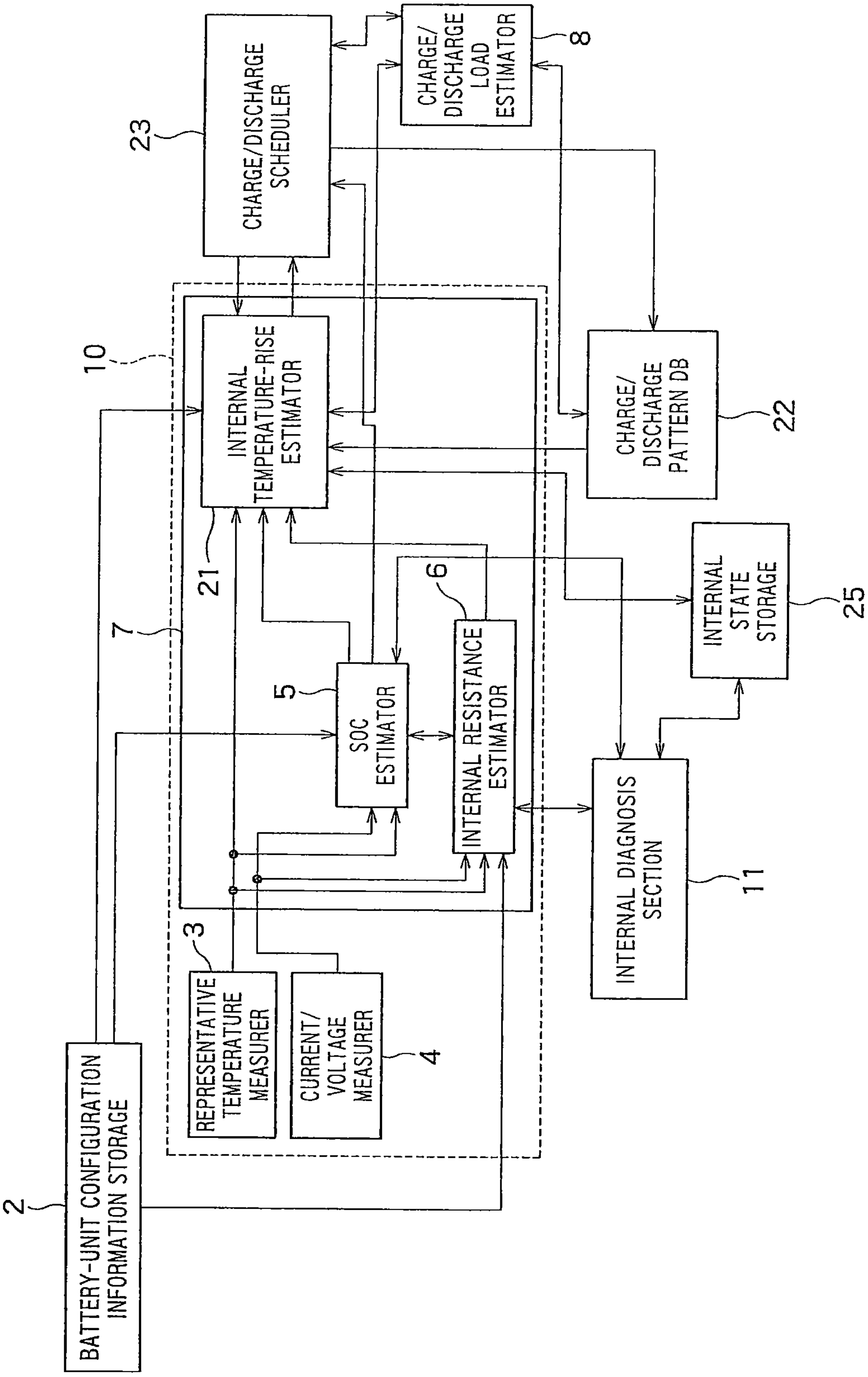
FIG. 3 shows a configuration of an internal state monitor/estimator according to the first embodiment.

FIG. 3 illustrates an example of a detailed configuration of the internal state estimator 7.

The representative temperature measurer 3 measures the temperature at a position where a temperature sensor is provided by using the temperature sensor provided to the battery unit 1.

The current/voltage measurer 4 measures the current and the voltage of the battery unit 1.

The internal state estimator 7 includes an SOC estimator 5, internal resistance estimator 6 and an internal temperature-rise estimator 21.

The SOC estimator 5 estimates a present SOC (state of charge) based on the temperature of the battery unit 1 measured by the representative temperature measurer 3, the current value and the voltage value of the battery unit 1 measured by the current/voltage measurer 4 and a piece of basic information on the battery unit 1 obtained from the battery-unit configuration information storage 2.

The internal resistance estimator 6 estimates an internal resistance of each cell in the battery unit 1 based on the temperature of the battery unit 1 measured by the representative temperature measurer 3 and the current value and the voltage value at the battery unit 1 measured by the current/voltage measurer 4 (a total of the internal resistances of the cells is equivalent to the internal resistance of the battery unit 1). Between the internal resistance and the SOC, since there is a correlation that the lower SOC has the smaller internal resistance during the charge, and the higher SOC has a smaller internal resistance during the discharge, the internal resistance and the SOC are mutually offset appropriately.

<Estimating Method of the Internal Resistance and the SOC>

The estimation of the internal resistance and the estimation of the SOC may be performed by using a generally known method. As an example, the following method is known as an internal resistance estimation method with high calculation accuracy. Outline of the method will be described below.

Figure 19:
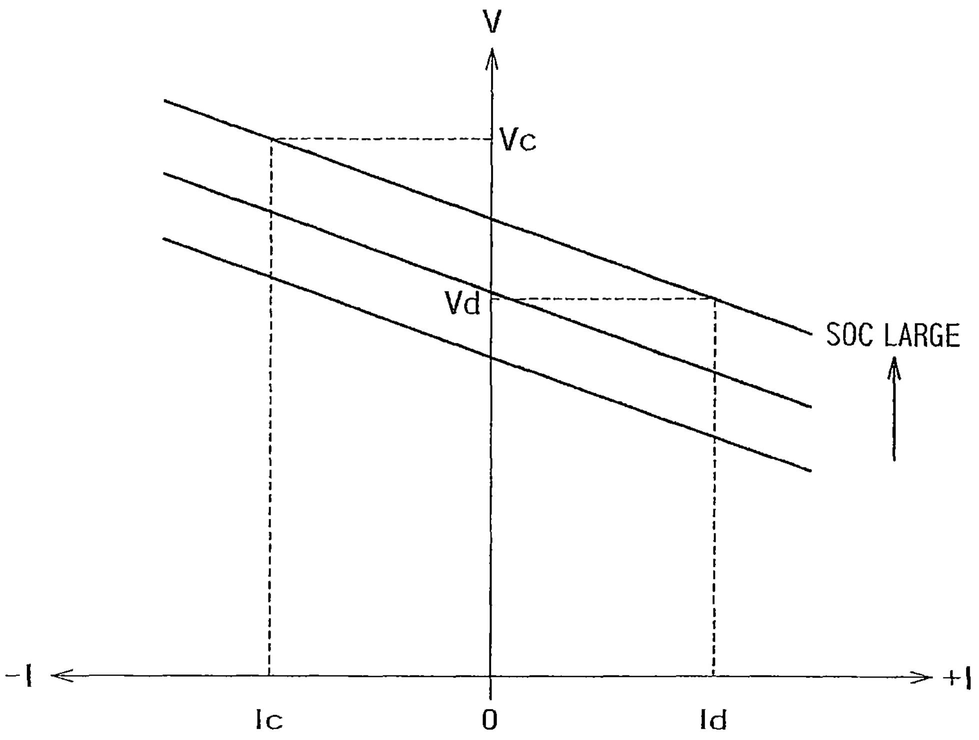
FIG. 19 is a diagram illustrating internal resistance and SOC estimation method.

FIG. 19 illustrates a relation of the voltage V with respect to the current I in a battery unit. In the battery unit, when a discharge current Id (>0) flows, a terminal voltage V lowers to Vd due to an internal resistance R. When a charge current Ic (<0) flows, the terminal voltage V rises to Vc due to the internal resistance R. As shown in formula (1), an inclination of a V-I line of a battery unit, which is determined by the voltage Vd and the current Id during the discharge and the voltage Vc and the current Ic during the charge, represents the internal resistance R of the battery unit. That is, by measuring the voltage Vd and the current Id during the discharge and the voltage Vc and the current Ic during the charge, the internal resistance R of the battery unit can be calculated by using formula (1):

$$R=(Vc-Vd)/(Id-Ic) \qquad (1)$$

Compared to in a method in which the V-I characteristic of the battery unit is estimated by using only the voltage and the current during the discharge or during the charge, in the method in which the V-I characteristic is estimated by using the voltages and the currents during the discharge and during the charge, the amount of change of the voltage and the current is larger. Thus, the V-I characteristic is estimated more precisely and thereby the internal resistance R can be detected more precisely.

Here, the open voltage (OCV) is a terminal voltage V at the current I=0. A voltage at a point of I=0, which is determined by the voltage Vd and the current Id during the discharge and the voltage Vc and the current Ic during the charge, is the OCV. The following formula (2) and formula (3) are the formulas for calculating the OCV, in which measured values of the voltage Vd and the current Id during the discharge, the voltage Vc and the current Ic during the charge and the internal resistance R are used:

$$OCV=Vd-R\times Id \qquad (2)$$

$$OCV=Vc+R\times Ic \qquad (3)$$

Figure 20:
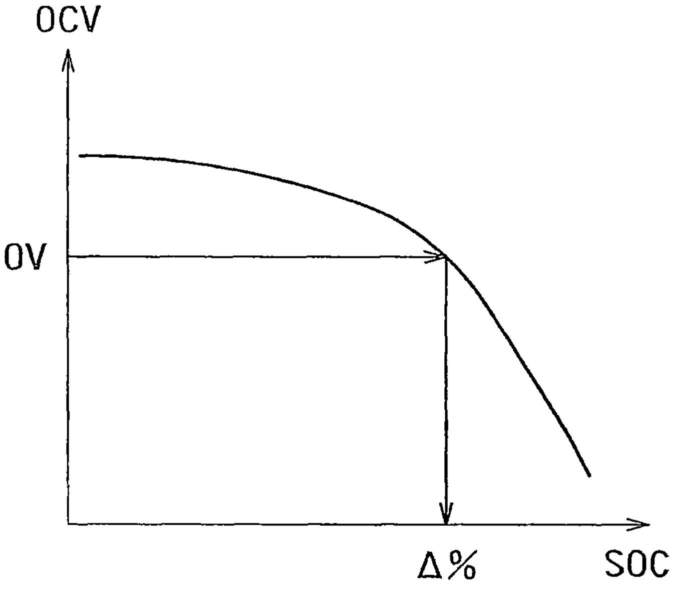
FIG. 20 is a diagram illustrating internal resistance and SOC estimation method.

Also, a map as shown in FIG. 20 may be previously created by measuring, for example, an OCV-SOC characteristic so that the SOC can be calculated based on the OCV by using an interpolation calculation of a mathematical formula such as a polynomial equation.

Figure 21:
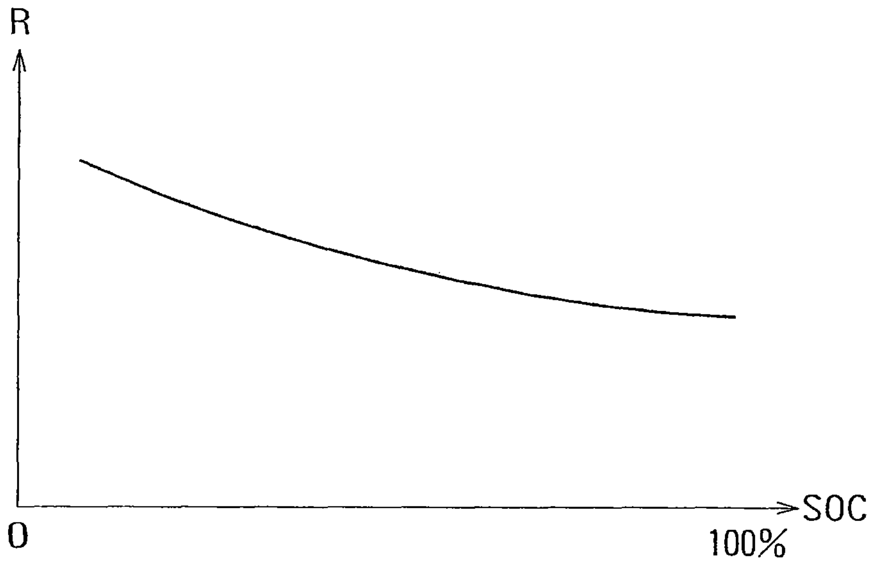
FIG. 21 is a diagram illustrating internal resistance and SOC estimation method.

The internal resistance R changes corresponding to the SOC as represented by a relation between the SOC and the internal resistance R during the discharge shown in FIG. 21. Therefore, the IV line itself rises as the SOC increases as shown in FIG. 19. Accordingly, in order to calculate the internal resistance R of the battery unit precisely, the SOC or the OCV at a point when the internal resistance R is calculated may be converted or offset to the internal resistance R of a predetermined battery state (SOC or OCV).

Figure 22:
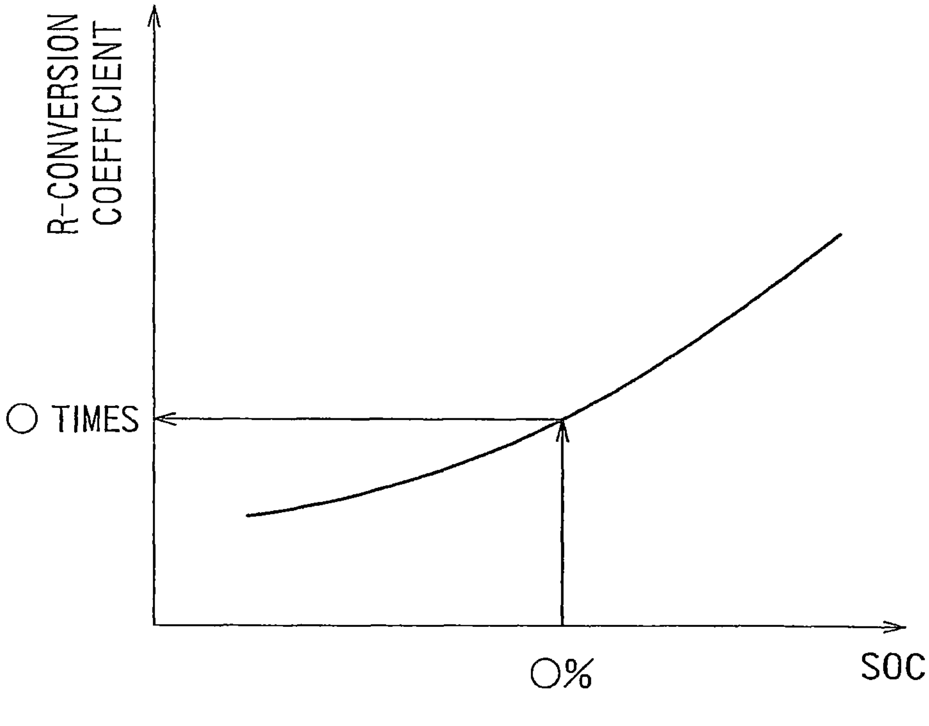
FIG. 22 is a diagram illustrating internal resistance and SOC estimation method.

Also, a map may be previously created and stored by measuring an internal resistance R-SOC (or OCV) characteristic as shown in FIG. 21. By performing an interpolation calculation using a mathematical formula such as polynomial equation, the internal resistance R in a predetermined state can be obtained based on the SOC (or OCV) as shown in FIG. 22.

The internal resistance R changes corresponding to the temperature state. Therefore, in order to calculate the internal resistance R on the battery unit precisely, the temperature of the battery unit at a point when the internal resistance R is calculated may be converted or offset to the internal resistance R in a predetermined temperature state.

Figure 23:
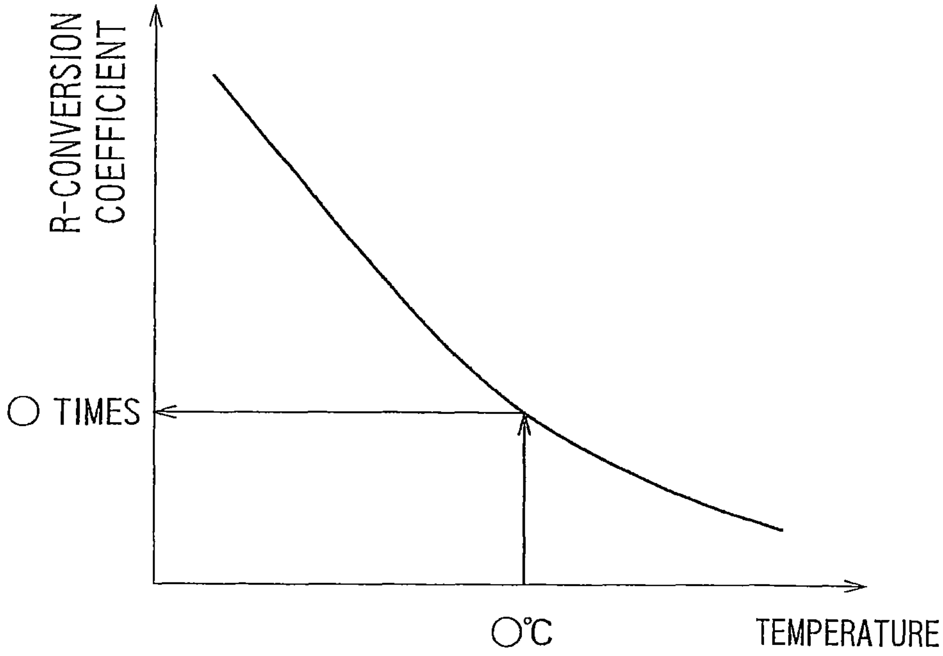
FIG. 23 is a diagram illustrating internal resistance and SOC estimation method.

Moreover, a map may be previously created and stored by measuring an internal resistance R-temperature characteristic. By performing an interpolation calculation by using a mathematical formula such as polynomial equation as shown in FIG. 23, the temperature of the battery unit may be converted or offset to the internal resistance R in a predetermined temperature state.

<Definition of the Load>

The internal resistance on the battery unit 1 is a changing value as described above, and it is known that the internal resistance rises as the deterioration progresses. Likewise, the charge/discharge capacity decreases as the deterioration progresses; generally, the rise of the internal resistance and the decrease of the charge/discharge capacity tend to have like correlation with each other. As the cause of the deterioration, it is known that thermal deterioration due to heat under a high temperature conditions, cycle deterioration as the charge/discharge cycle increases, or deterioration due to charge/discharge under cold/hot conditions are known. Further, the charge/discharge under the SOC condition such as the discharge in a state that the SOC is lower than 20% and the charge in a state that the SOC is over 80% may cause deterioration.

In a document provided at Forum 2010 held by incorporated administrative agency, National Traffic Safety and Environment Laboratory (http://www.ntsel.go.jp/forum/2010files/10-02p.pdf), a formula of deterioration due to heat is proposed in which thickness of layer and constant of internal circuit are correlated with each other based on a phenomenon that layer which is formed on the surface of carbon material at the negative electrode increases its thickness. The above document describes that the test result of charge/discharge cycle under a certain temperature can be represented by superposition of the deterioration due to temperature and the deterioration due to increase of cycles. According to the document, in the case of a lithium-ion battery, the deterioration due to increase of cycles is a deterioration process which is caused by a stress given to the surface material on the electrode due to the lithium ion which physically enters into/out-goes from the surface material of the electrode.

The embodiment is intended to minimize the load amount particularly during performing the charge/discharge by quantitatively estimating the load amount given to the battery unit 1 based on measurable values based on the analysis of deterioration factors as described above. Since the estimation relates to the load accompanying the charge/discharge, the number of cycles changes at most by 1. Therefore, the load accompanying the charge/discharge is estimated by mainly using thermal load. Since effect of deterioration due to thermal cycle in which temperature is increased/lowered is also conceivable, it is configured so that the effect due to the thermal cycle is considered when the charge/discharge pattern is selected.

The estimation of the load accompanying the charge/discharge according to the embodiment is, particularly based on the quantification of the effect due to the thermal factor as shown in FIG. 5; and on the quantification of the load considering the SOC as shown in FIG. 9. An example of load amount estimation based on FIG. 5 and FIG. 9 will be described later.

As for the deterioration in a storage condition of the battery unit 1 other than during charge/discharge, the thermal load can be also calculated using load indexes shown in FIG. 5 and FIG. 9. In addition to the above, present state of the deterioration may be estimated by counting the number of the charge/discharge cycles. This operation is made by the internal diagnosis section 11, the resultant is stored in the internal state storage 25.

<Estimation Method of Internal Temperature-Rise Estimator>

The internal temperature-rise estimator 21 reads the charge/discharge pattern specified by the charge/discharge scheduler 23 from the charge/discharge pattern DB 22 and estimates a time-change (time-transition) of the internal temperature of the battery unit 1 when the charge/discharge is performed using the charge/discharge pattern based on the temperature of the battery unit 1 measured by the representative temperature measurer 3, the SOC on the battery unit 1 estimated by the SOC estimator 5, the internal resistance on the battery unit 1 estimated by internal resistance estimator 6 and the characteristic information of the battery unit 1 obtained by the battery-unit configuration information storage 2. The time-change of the internal temperature may include a piece of information such as, for example, an elevated level for each minimum schedule time, a maximum temperature and the like. As for the elevated level for each minimum schedule time, a temperature-rise amount is calculated by assuming the SOC which changes for each minimum schedule time and by estimating the internal resistance corresponding to the SOC.

Figure 4:
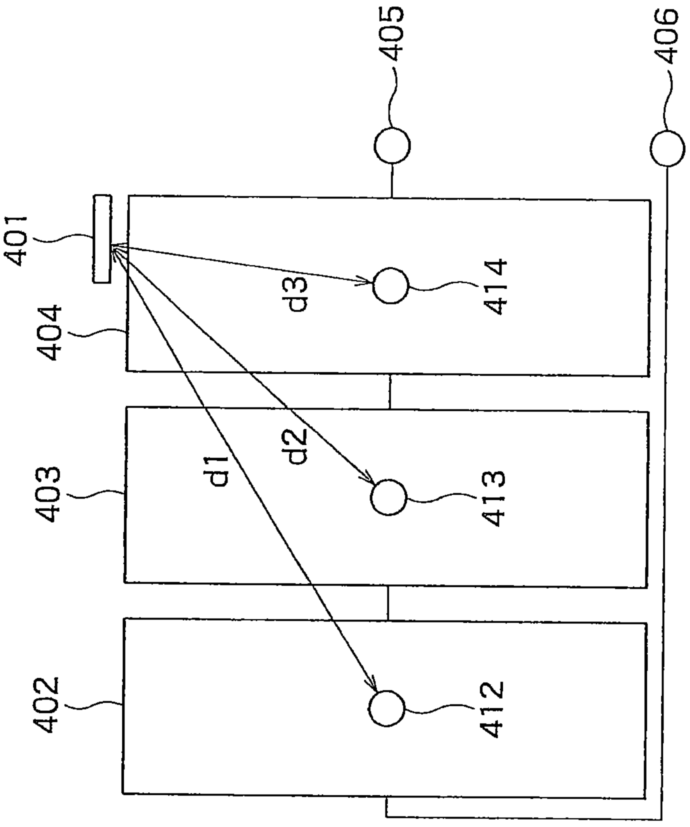
FIG. 4 is a diagram showing an example of a configuration of a battery unit.

A description will be made below while taking a case where the battery unit 1 includes three battery cells as shown in FIG. 4 as an example of the above.

The battery unit 1 includes a temperature sensor 401, a positive electrode 405, a negative electrode 406, a battery cell 402 (cell 1), a battery cell 403 (cell 2) and a battery cell 404 (cell 3).

First, a piece of information on positional relation of the temperature sensor and the battery cells is obtained from the battery-unit configuration information storage 2, and a piece of information on internal resistance is obtained from the internal resistance estimator 6.

Based on the obtained information, a distance "d1" from the temperature sensor 401 to the temperature estimation point 412 on the battery cell 402 and an internal resistance "r1" of the battery cell 402; a distance "d2" from the temperature sensor 401 to the temperature estimation point 413 of the battery cell 403 and an internal resistance "r2" of the battery cell 403; and a distance "d3" from the temperature sensor 401 to the temperature estimation point 414 on the battery cell 404 and an internal resistance "r3" of the battery cell 404 are obtained.

A representative temperature "T0" of the present battery unit 1 is obtained from the temperature sensor 401.

Corresponding to the specified charge/discharge pattern, the temperature at each temperature estimation point is estimated based on the flown current "i" using the following formulas:

Temperature "$T1$" of a temperature estimation point
$$412=k1\times i^2\times r1+T0+k21\times k2\times i^2\times r2+k31\times k3\times i^2\times r3 \quad \text{Formula T1}$$

Temperature "$T2$" of a temperature estimation point
$$413\times k2\times i^2\times r2+T0+k12\times k1\times i^2\times r1+k32\times k3\times i^2\times r3 \quad \text{Formula T2}$$

Temperature "T3" of a temperature estimation point
$413=k3\times i^2\times r3+T0+k13\times k1\times i^2\times r1+k23\times k2\times i^2\times r2$ Formula T3

Here, "k1, k2 and k3" are values which are determined by physical properties such as specific heat of the cells 1, 2 and 3, and are obtained from the battery-unit configuration information storage 2. Also, "k12, k13, k21, k23, k31 and k32" are values representing influence coefficient of the amount of heat which is transferred from each cell to other cells. For example, "k21" is a value which represents an influence coefficient of the amount of heat transferred from the cell 2 to the cell 1; k32 is a value which represents an influence coefficient of the amount of heat transferred from the cell 3 to the cell 2.

When the internal resistance for each cell cannot be measured, an internal temperature "Ts" on the battery unit 1 is estimated with the following formula using the internal resistance "rs" for each battery unit equivalent to "r1+r2+r3". Here, "ks" is a known value unique for the battery unit.

Internal temperature "Ts" on the battery unit $1=ks\times i^2\times rs+T0$

Assuming the SOC which changes for each minimum schedule time, the temperature-rise amount is obtained by estimating an internal resistance corresponding to the SOC.

Also, as for the effect due to natural heat release while the charge/discharge is not made, an internal temperature of the battery unit 1 may be estimated using a piece of information obtained from the battery-unit configuration information storage 2. In this case, for example, the formula T1 may be replaced by a formula T1' in which a term of natural heat release is added as below:

Temperature "T1'" of the temperature estimation point
$412=k1\times i^2\times r1+T0+k21\times k2\times i^2\times r2+k31\times k3\times i^2\times r3\times kenv\times|T0-Tenv|$ Formula T1'

Here, "kenv" is a value which represents an influence coefficient of amount of heat transferred between the battery unit 1 and the external out of the battery unit 1 due to natural heat release, and "Tenv" is an external ambient temperature of the battery unit 1.

<Internal Resistance Estimation Method for Each Cell>

The internal resistance for each cell may be obtained by performing internal state diagnosis on each cell. However, defining the internal resistance of the battery unit 1 as "r0", "r1, r2 and r3" may be calculated so that the following relation is satisfied based on a temperature "Tf" measured by the temperature sensor 401 by actually performing the charge/discharge with a current "i":

$$r0=r1+r2+r3$$

$$Tf-T0=ks\times(k1\times i^2\times r1)/d1^2+(k2\times i^2\times r2)/d2^2+(k3\times i^2\times r3)/d3^2$$

Here, "ks" is a known value unique to the battery unit as described above.

The measured internal resistance of each cell as described above is stored in the internal state storage 25 as the internal resistance of each cell after the charge/discharge is performed.

Also, in order to perform the estimation as described above, the charge/discharge scheduler 23 may specify a specific charge/discharge pattern to actually perform the charge/discharge to thereby measure the internal state.

<Operation of the Charge/Discharge Load Estimator>

The charge/discharge load estimator 8 calculates the load of each charge/discharge pattern given to the battery unit 1 by using a piece of information on the internal temperature of the battery unit 1 which is calculated as described above. When the temperature is calculated on each battery cell, the highest temperature is used from "T1, T2 and T3". When the temperature of the entire battery unit 1 is only calculated, the internal temperature "Ts" of the battery unit 1 is used. An example of the load calculation is described below.

Load indexes corresponding to the temperatures are previously prepared in accordance with the characteristics of the battery unit 1 as shown in FIG. 5. FIG. 5 illustrates an example of a load index table in which load indexes (or, simply referred to as load) per unit time are prescribed for each temperature range. The load amount obtained by executing the charge/discharge pattern is calculated by using the formula below.

$$\text{Load amount "}La\text{" of the battery unit } 1=\sum_n Ln\times(\text{rest-period in temperature range "}n\text{"})$$ Formula A When the load of the battery unit 1 is calculated, in the battery unit 1 in which deterioration has progressed and the internal resistance has increased, the temperature-rise amount with respect to the same current amount becomes larger causing a larger load. When a load is applied to the deteriorated battery unit 1 or battery cells, the deterioration progresses. Therefore, the charge/discharge scheduler 23 selects a charge/discharge pattern which reduces the temperature rise to reduce the progression of the deterioration. Here, the load amount is defined by using the formula A. However, the load amount may be defined by using another method. For example, the maximum temperature obtained by executing the charge/discharge pattern may be defined as the load amount.

<Operation of the Charge/Discharge Scheduler>

The charge/discharge scheduler 23 sequentially selects candidate charge/discharge patterns corresponding to the specified charge/discharge amount from the plurality of charge/discharge patterns stored in the charge/discharge pattern DB 22, and calculates the load amount "La" of the battery unit 1 by using the charge/discharge load estimator 8.

Figure 6:
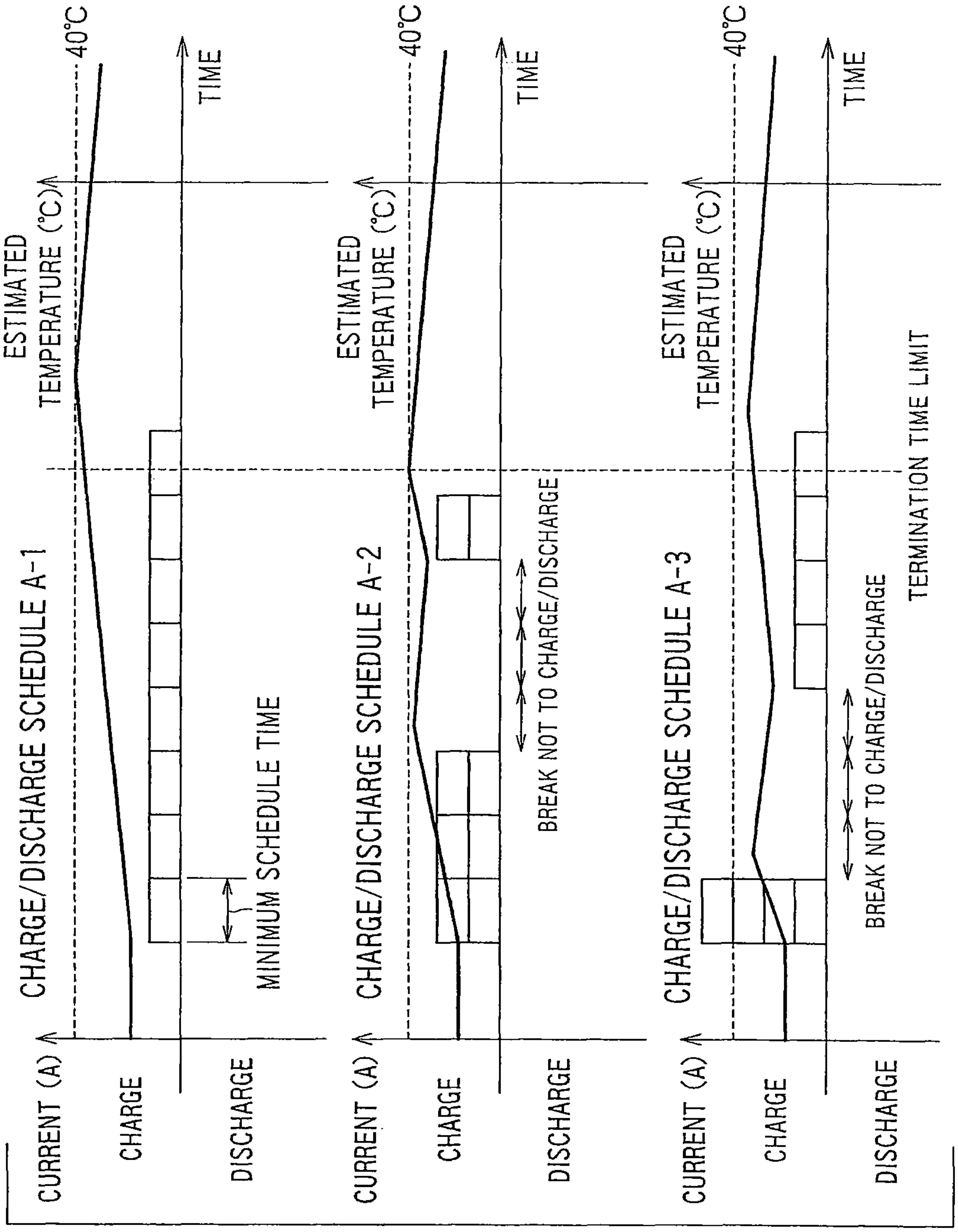
FIG. 6 is a diagram showing an example of a relation between charge/discharge schedule and estimated temperature.

Referring to FIG. 6, selection modes of the charge/discharge schedule (charge/discharge pattern) are described. FIG. 6 illustrates an example in which load amounts La1, La2 and La3 of charge/discharge schedules A-1, A-2 and A-3 as three patterns are calculated. The charge/discharge pattern is achieved in a pattern of the charge/discharge amount in each minimum schedule time (unit time) as shown in FIG. 6. In FIG. 6, the lateral size of one square corresponds to the minimum schedule time; and vertical size thereof corresponds to the minimum scheduled charge/discharge amount (minimum schedule current amount). For example, a plurality of charge/discharge patterns are prepared for each charge/discharge amount.

In each charge/discharge pattern, the load index shown in FIG. 5 proceeds in a temperature range of 40° C. or less. The load amount is calculated based on the table in FIG. 5, a charge/discharge pattern (charge/discharge schedule) which has a smallest load amount is selected from these charge/discharge patterns.

In place of selecting a charge/discharge pattern which has the minimum load amount, the charge/discharge scheduler 23 may select a plurality of (for example, three) candidate charge/discharge patterns having a small load amount and determine the final charge/discharge pattern using another index such as the number of the charge/discharge cycles (which will be described later) from these charge/discharge patterns.

<When Estimating Internal State of Each Cell>

As described above, when estimation of the temperature of each battery cell included in the battery unit 1 is possible, the load amount is calculated using the highest temperature in the temperatures of the battery cells to select the charge/discharge pattern. That is, for each minimum schedule time, a cell which has the highest temperature is determined, and the load amount is calculated on the basis of the cell.

<When Charge/Discharge Instruction Includes Termination Time Limit>

When the charge/discharge instruction includes a limitation of charge/discharge termination time, a charge/discharge pattern which has the smallest load amount "La" in the charge/discharge patterns satisfying the limitation is selected.

Figure 8:
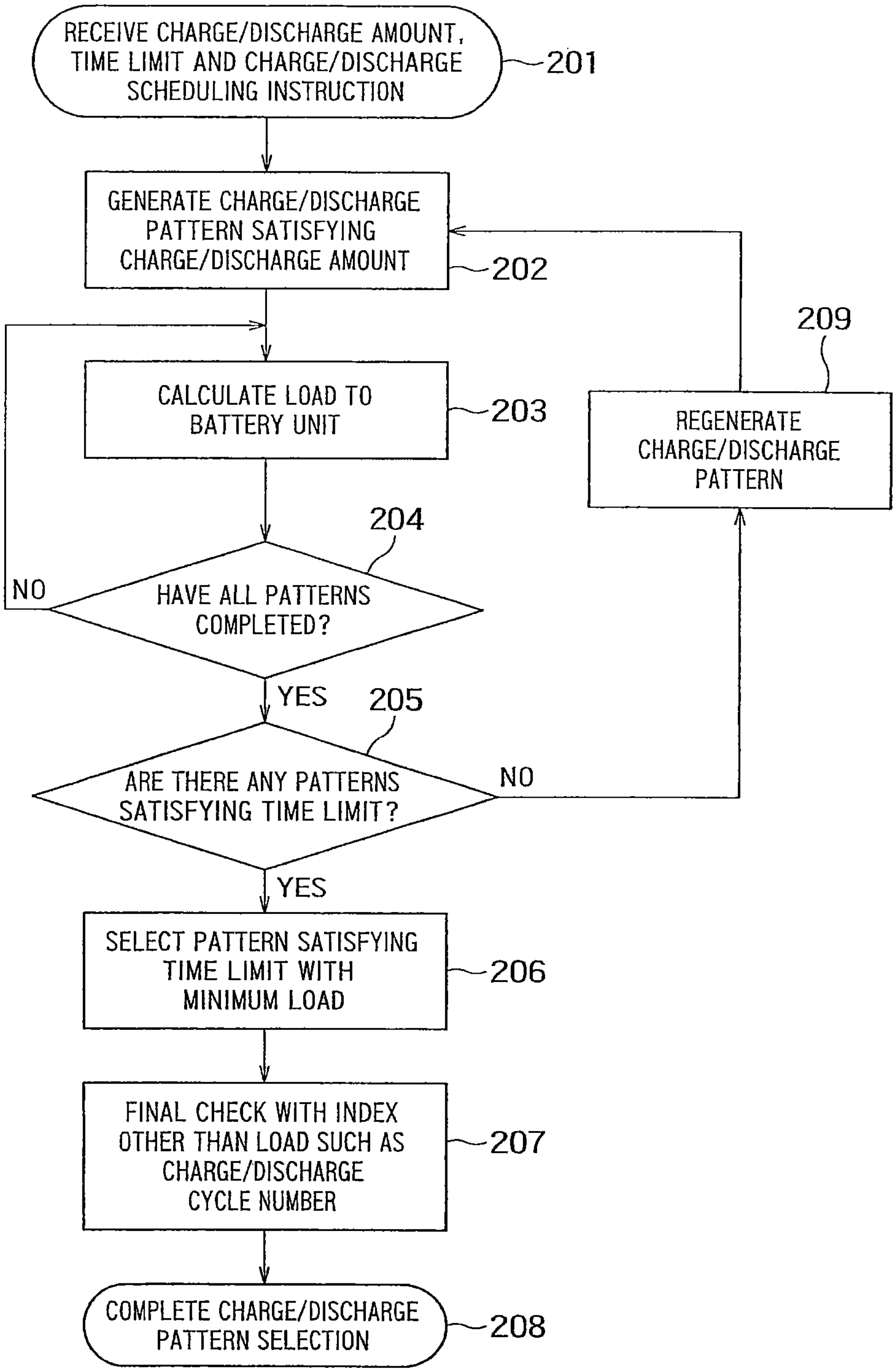
FIG. 8 is a diagram showing an example of a processing flow made by a charge/discharge scheduler.

FIG. 8 illustrates an example of a charge/discharge scheduling flow made by charge/discharge scheduler 23, which considers the possibility of existence of time limit.

First, the charge/discharge scheduler 23 receives a charge/discharge scheduling instruction including the charge/discharge amount from the charge/discharge management section 24 (step 201). In this case, the time limit may be included. Subsequently, the charge/discharge scheduler 23 refers to the charge/discharge pattern DB 22 and selects or generates a plurality of charge/discharge patterns satisfying the charge/discharge amount (step 202).

The selected or generated charge/discharge patterns are input to the charge/discharge load estimator 8, a piece of information on the internal state (internal resistance, SOC, temperature, etc.) is obtained from the internal state estimator 7 and the load of the battery unit 1 is calculated for each charge/discharge pattern (step 203).

When every load calculation on every selected or generated charge/discharge pattern has completed (step 204), in the case the time limit is included, it is checked if the time limit is satisfied (step 205) and a charge/discharge pattern which has the minimum load amount is selected from the charge/discharge patterns which satisfy the time limit (step 206). Here, when the charge/discharge scheduler 23 selects by using an index other than the load (the number of charge/discharge cycle, etc.), a plurality of charge/discharge patterns are selected in step 206, one charge/discharge pattern is selected based on the index other than the load from the plurality of charge/discharge patterns (step 207). Thus, the flow is completed (step 208).

In step 205, in the case where a time limit is set, when no charge/discharge pattern that satisfies the time limit is included, a charge/discharge pattern which is adjusted in a time axis direction is generated again (step 209).

When calculating the load of the battery unit 1, the SOC may be considered as well as an estimated temperature. An example of this case is described referring to FIG. 9. FIG. 9 illustrates an index table prescribing load indexes for each unit time corresponding to the combination of the temperature range and the SOC. The load index corresponding to the SOC and the estimated temperature is determined based on the table and the load amount "La" is calculated as the formula A. With this, the state of the battery unit 1 is reliably obtained, and a charge/discharge schedule which prevents the deterioration is created and the charge/discharge operation is performed. Particularly, the load of the charge in a state with high SOC or the load of the discharge in a state with low SOC can be precisely estimated.

<Creating of Charge/Discharge Schedule in which Estimated Temperature Never Exceeds a Predetermined Value>

In the above description, an example in which the charge/discharge schedule is created based on the load amount of the battery unit 1 which is calculated by using the formula A has been given. In order to use the system more simply, a charge/discharge schedule in which the internal temperature of the battery unit 1 never exceeds a predetermined value (threshold value) may be created. That is, by defining the load amount as the maximum value of the internal temperature of the battery unit 1, a charge/discharge schedule in which the maximum value of which does not exceed a predetermined value is created.

Figure 7:
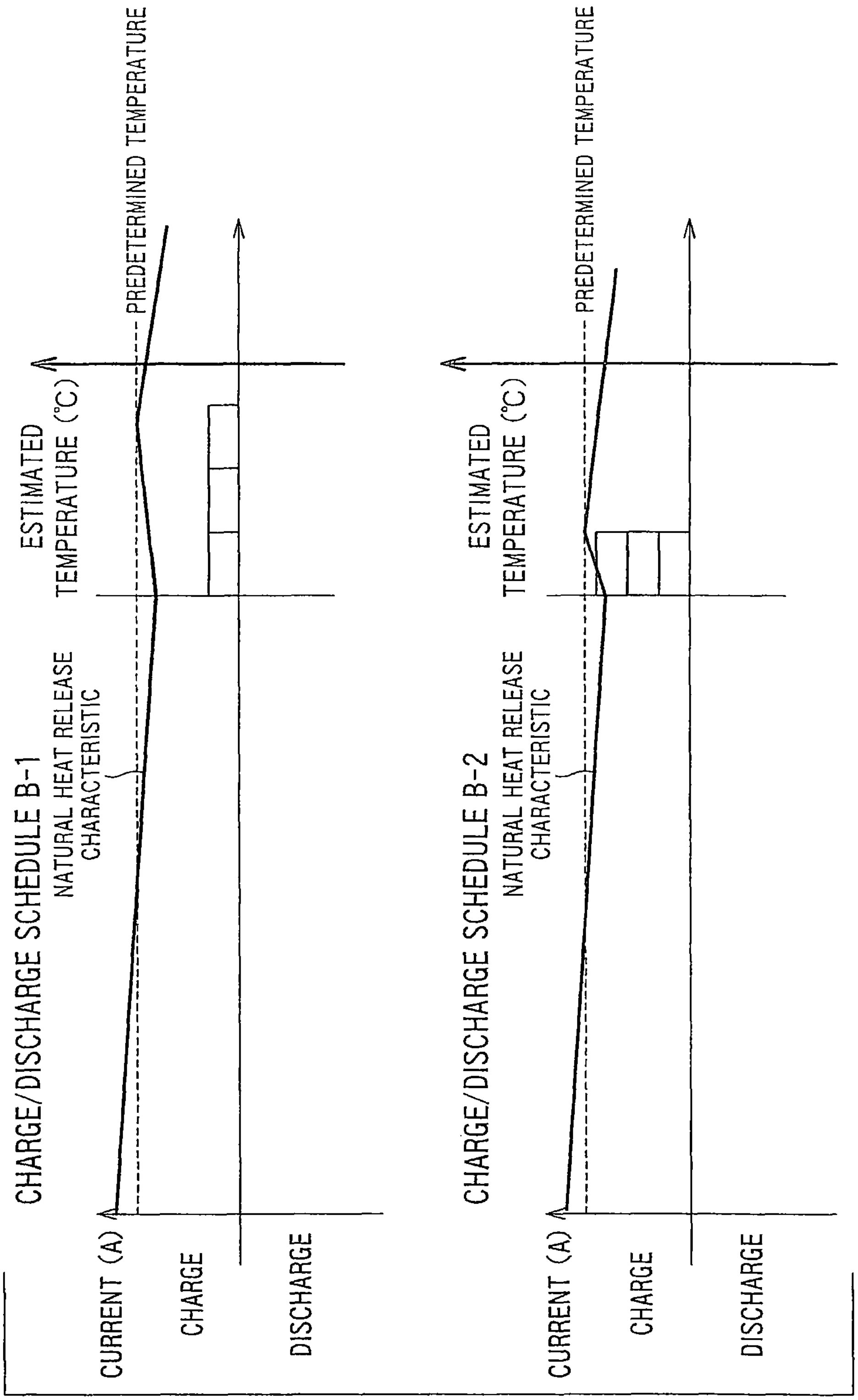
FIG. 7 is a diagram showing an example of a relation between charge/discharge schedule and estimated temperature in the case of a high initial temperature.

As shown in FIG. 7, for example, when the temperature of the battery unit 1 exceeds a predetermined temperature at a point when a charge/discharge instruction is received, the charge/discharge is stopped until the temperature lowers to a predetermined temperature or less due to natural heat release, and a charge/discharge schedule B-1 or a charge/discharge schedule B-2 in which the predetermined temperature does not exceed the predetermined temperature even when the charge/discharge is made is selected as the charge/discharge pattern.

In this case also, the selection of the charge/discharge schedule B-1 or B-2 may be determined while considering the time limit and the number of the charge/discharge cycle.

<Example of Charge/Discharge Pattern Generating Method>

Minimum schedule time and minimum schedule current amount are previously set. A piece of information on the present estimated internal temperature and the next threshold temperature at which the load changes when the temperature rises as set in the index table shown in FIG. 5 is obtained. "2P" of minimum schedule current amounts (P: integer) in a minimum schedule time from start of the charge/discharge until the next threshold temperature is exceeded are added. Then, a temperature rising curve when the charge/discharge is carried out is estimated.

Subsequently, a temperature lowering curve based on a natural heat release curve is estimated. And the current amount in the minimum schedule time is added until the next threshold temperature is exceeded again at either timing (1) when the temperature reaches the estimated internal temperature before the charge/discharge or (2) when the temperature lowers by an amount equivalent to the temperature rise when the remaining charge/discharge amount is charged or discharged in the minimum schedule time.

The charge/discharge schedule in which the above process is repeated is the basic schedule (basic pattern). The process proceeds to the next minimum schedule time after reducing the charge/discharge amount in the first minimum schedule time to a half. A temperature rising curve when the above charge/discharge is made is estimated. A temperature lowering curve based on the natural heat release curve is estimated. Thus, the same cycle is repeated to prepare various charge/discharge patterns.

By assuming the SOC which changes in each minimum schedule time and estimating the internal resistance corresponding to the SOC, the temperature-rise amount is obtained.

Figure 13:
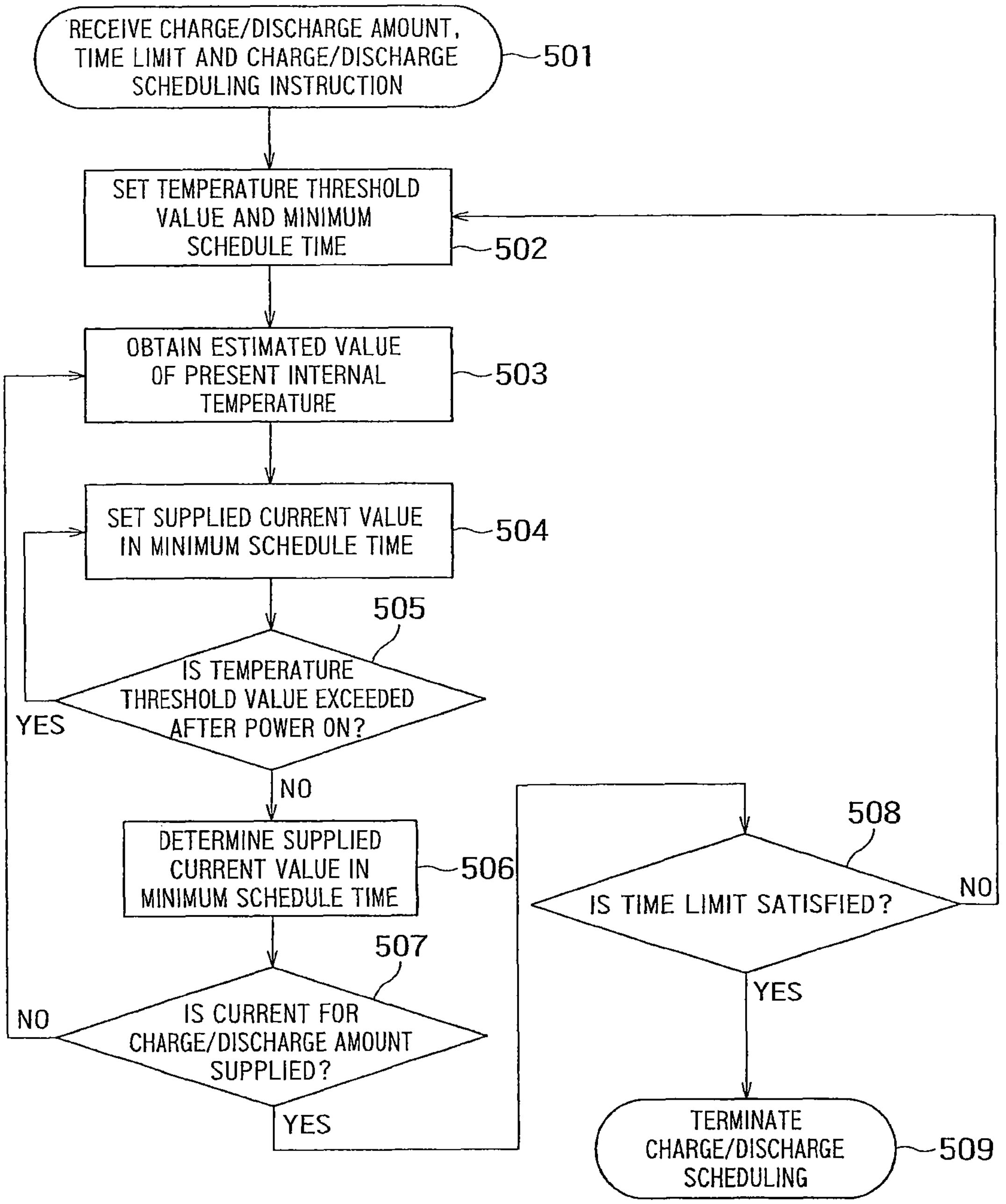
FIG. 13 is a diagram showing a processing flow according to the first embodiment.

In the case including a time limit, when a schedule in which the temperature does not exceed the next threshold temperature cannot be created, a temperature next higher to the above next threshold temperature in the index table shown in FIG. 5 at which the load changes is set as the threshold temperature, thereby the charge/discharge schedule is created. For example, when a schedule in which the temperature does not exceed 50° C. indicated in FIG. 5 cannot be created, the threshold temperature is increased to 60° C. to thereby create the charge/discharge schedule. FIG. 13 illustrates the processing flow.

The charge/discharge scheduler 23 receives a piece of information on the charge/discharge amount and the time limit from the charge/discharge management section 24 along with the schedule creation instruction (step 501), and starts the charge/discharge scheduling. Referring to the load table in FIG. 5, a temperature threshold is set, and a minimum schedule time for creating a schedule is set (step 502).

Subsequently, an estimation value at the present internal temperature is obtained from the internal state estimator 7 (step 503), and a supplied current amount in the minimum schedule time is set (step 504). Here, as described above, the supplied current amount is set so as to be multiple of the minimum schedule current amount. Also, the supplied current amount in the minimum schedule time is set so as not to exceed the charge/discharge amount instructed by the charge/discharge management section 24.

Subsequently, an internal temperature rise when the supplied current amount is supplied for a period of the minimum schedule time is estimated as formula T1, formula T2 and formula T3, and is determined if the set temperature threshold is exceeded (step 505). Here, when the temperature threshold is exceeded, the supplied current amount is reduced to a half or (2p−q), and the supplied current amount is reset. And it is determined if the temperature threshold is exceeded. By repeating the above operation to obtain a supplied current amount within the temperature threshold, thus the supplied current amount within the minimum schedule time is determined (step 506).

It is determined if an integrated value of the supplied current amount has reached the instructed charge/discharge amount. When it is determined as not reached, the process proceeds to a determination of the supplied current amount in the next minimum schedule time (step 507).

In the determination process of the supplied current amount in the next minimum schedule time, an estimation value of the internal temperature is obtained again (step 503). Here, when a difference between the obtained internal temperature estimation value and the temperature threshold is smaller than the predetermined value, the charge/discharge in the minimum schedule time is stopped to prevent charging/discharging until the difference between the internal temperature estimation value and the temperature threshold is larger than the predetermined value due to the natural heat release characteristic.

The above process is repeated and when the supplied current amount has reached the charge/discharge amount, it is determined if the schedule satisfies the time limit (step 508). When the time limit is satisfied, the creation of the charge/discharge schedule is terminated (step 508). When the time limit is not satisfied, the temperature threshold is reset to a higher threshold temperature (step 502), and the charge/discharge schedule is updated.

Figure 14:
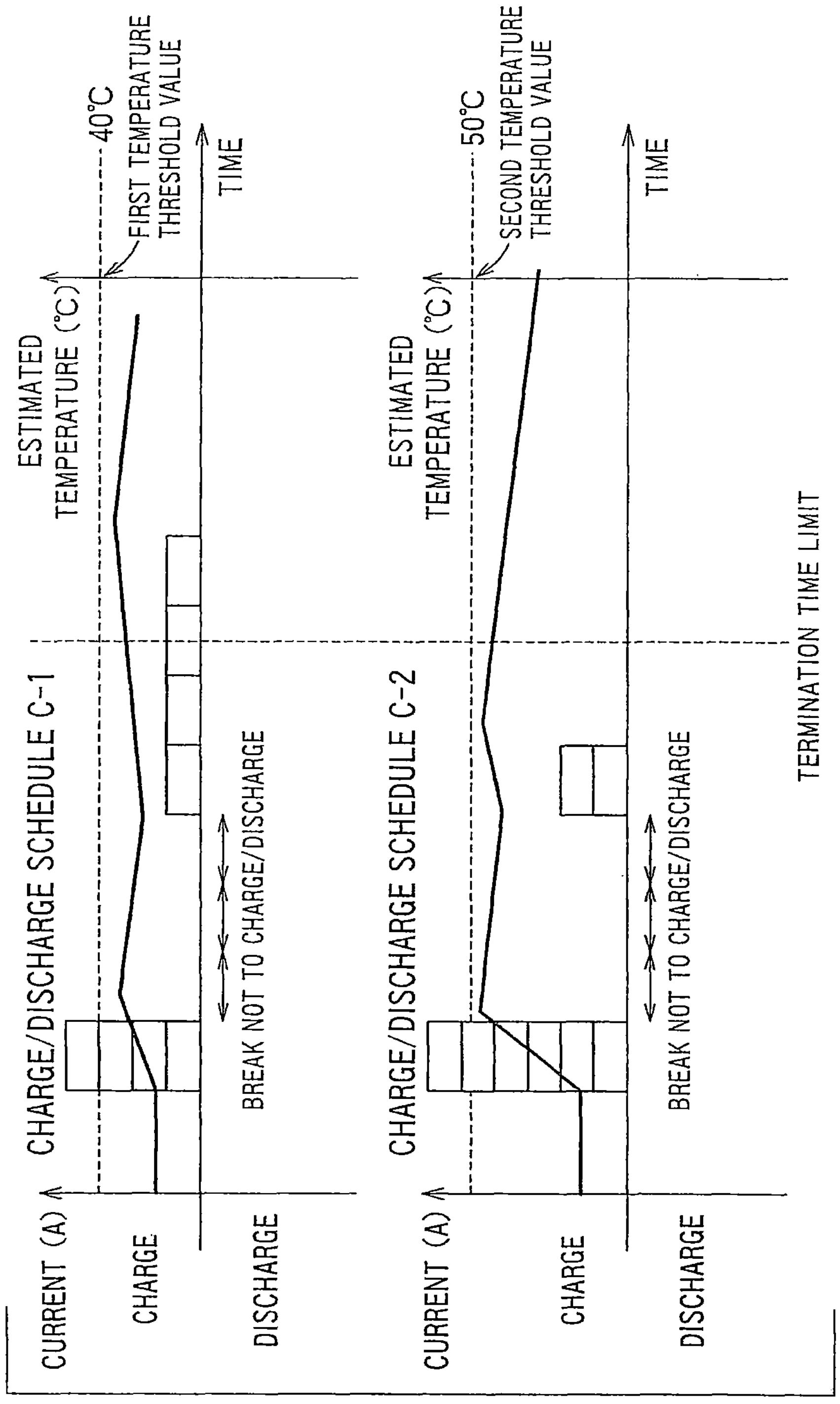
FIG. 14 is a diagram showing an example of a relation between charge/discharge schedule and estimated temperature.

FIG. 14 illustrates a case in which a schedule like charge/discharge schedule C-1 is created, but since the time limit is not satisfied, the threshold value is increased to create a charge/discharge schedule C-2.

<When the Minimum Schedule Time is Variable>

Figure 15:
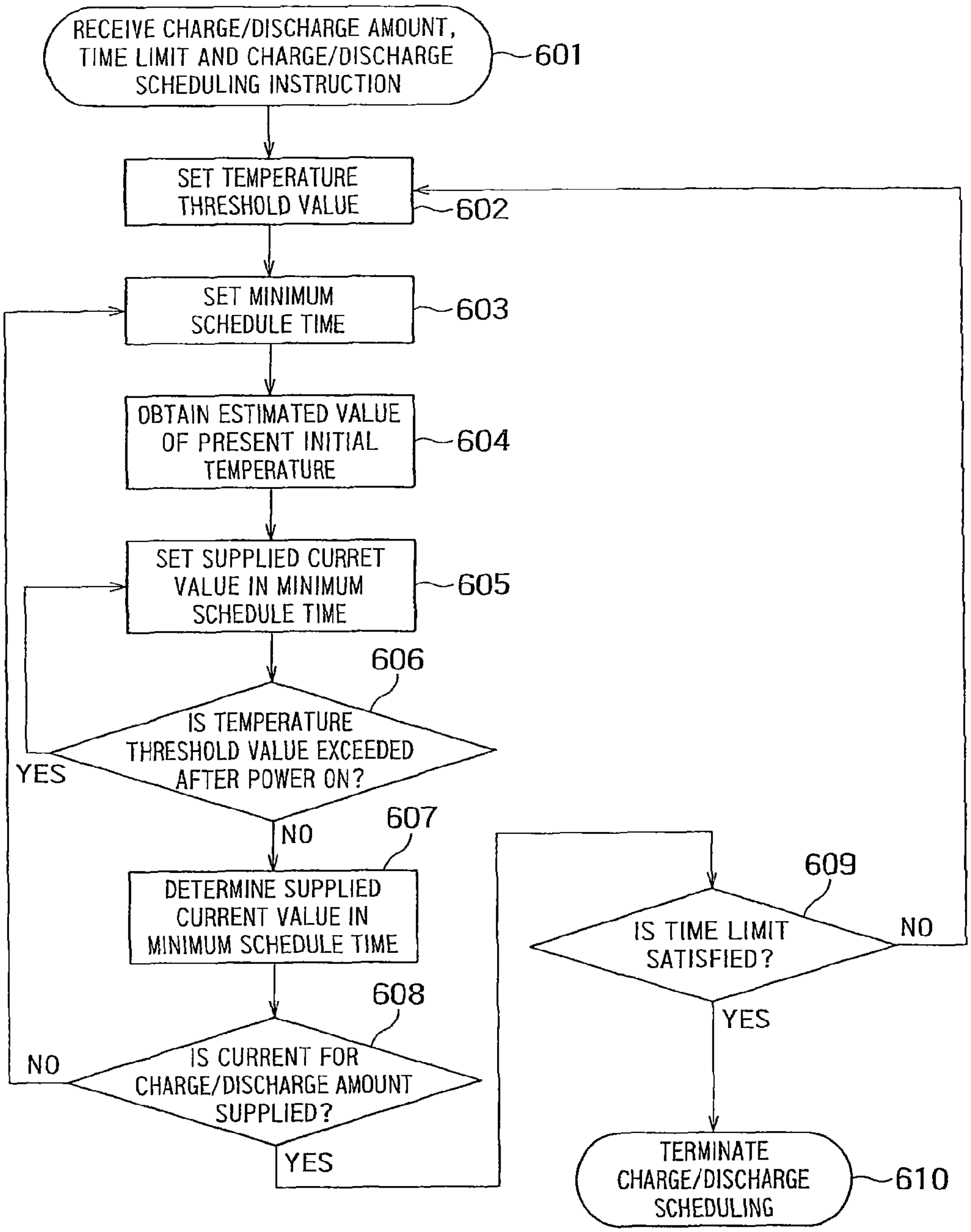
FIG. 15 is a diagram showing a processing flow according to the first embodiment.

The minimum schedule time may be variable. FIG. 15 illustrates a processing flow in this case. The processing flow in FIG. 15 is different from the processing flow in FIG. 13 in the following point. That is, when the integrated value of the supplied current amount has not reached the charge/discharge amount (step 608), and when the integrated value of the supplied current amount is smaller than a predetermined value, a smaller minimum schedule time is set; while when the integrated value of the supplied current amount is larger than a predetermined value, a larger minimum schedule time is set (step 603). Steps other than steps 603 and 608 are the same as those in FIG. 13.

Figure 16:
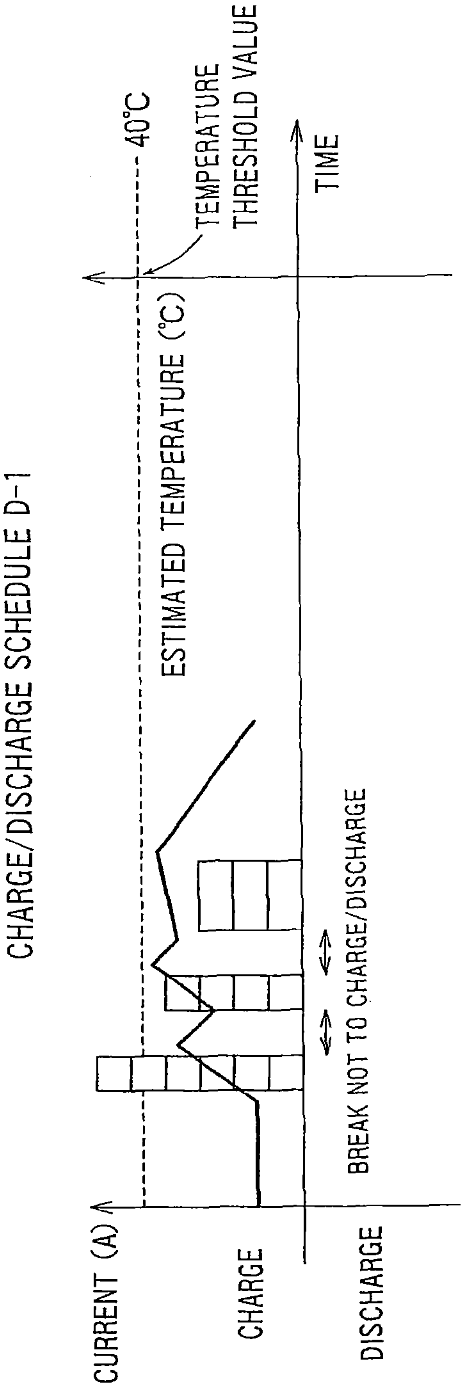
FIG. 16 is a diagram showing an example of a relation between charge/discharge schedule and estimated temperature.

By executing the processing flow in FIG. 15, a charge/discharge schedule D-1 shown in FIG. 16 is created as a result.

<Continuous Diagnosis of Deterioration Amount of the Battery Unit>

When the system has the configuration shown in FIG. 1, even while the battery unit 1 is not being charged or discharged, by the internal diagnosis made regularly by the internal diagnosis section 11, a deterioration amount of the battery unit 1 itself can be obtained with the following formula.

$$\text{Deterioration amount of the battery unit } 1 = p1 \times La + p2 \times (\text{number of charge/discharge cycles})$$

"La" is a load amount defined by the formula A (a value obtained based on time placed in a temperature range and the load). Even in a state the charge/discharge is not made, a state the deterioration progresses when the battery unit is placed in a high temperature condition can be obtained. By adding the time, thermal deterioration amount can be estimated in a quantitative form. The number of charge/discharge cycles is an addition (or integral) of "an additional value of number of charge/discharge cycles" which is obtained the following formula, which is a value depending on the charge/discharge amount when the charge/discharge is made. "P1" and "p2" are unique coefficients contributing to the deterioration, which are determined depending on the battery unit 1.

$$\text{Additional value of number of charge/discharge cycles} = (\text{charge/discharge amount})/(\text{maximum charge/discharge capacity})$$

The operation of the internal diagnosis section 11 at this time is to estimate the load amount of the battery unit 1 at predetermined intervals using the formula A from the internal state estimator 7 in accordance with an instruction from the charge/discharge management section 24. When executing the charge/discharge, an additional value of number of charge/discharge cycles is obtained from the charge/discharge amount actually generated by the charge/discharge management section 24, and is stored in the internal state storage 25.

<Forced Raising Temperature at Low Temperature>

In the configuration shown in FIG. 1, the internal diagnosis section 11 regularly obtains a piece of information on the estimated internal temperature from the internal state estimator 7. When the temperature is lowered to a predetermined temperature or less, the internal diagnosis section 11 notifies the charge/discharge management section 24 to execute a forced charge/discharge to thereby maintain the internal temperature of the battery unit 1 to be predetermined temperature or more.

Second Embodiment

A second embodiment is characterized in that in the case of the battery unit 1 constituted of an assembled battery having a plurality of storing modules, a function to determine a storing module to be charged/discharged and a charge/discharge schedule to be executed are provided.

Figure 10:
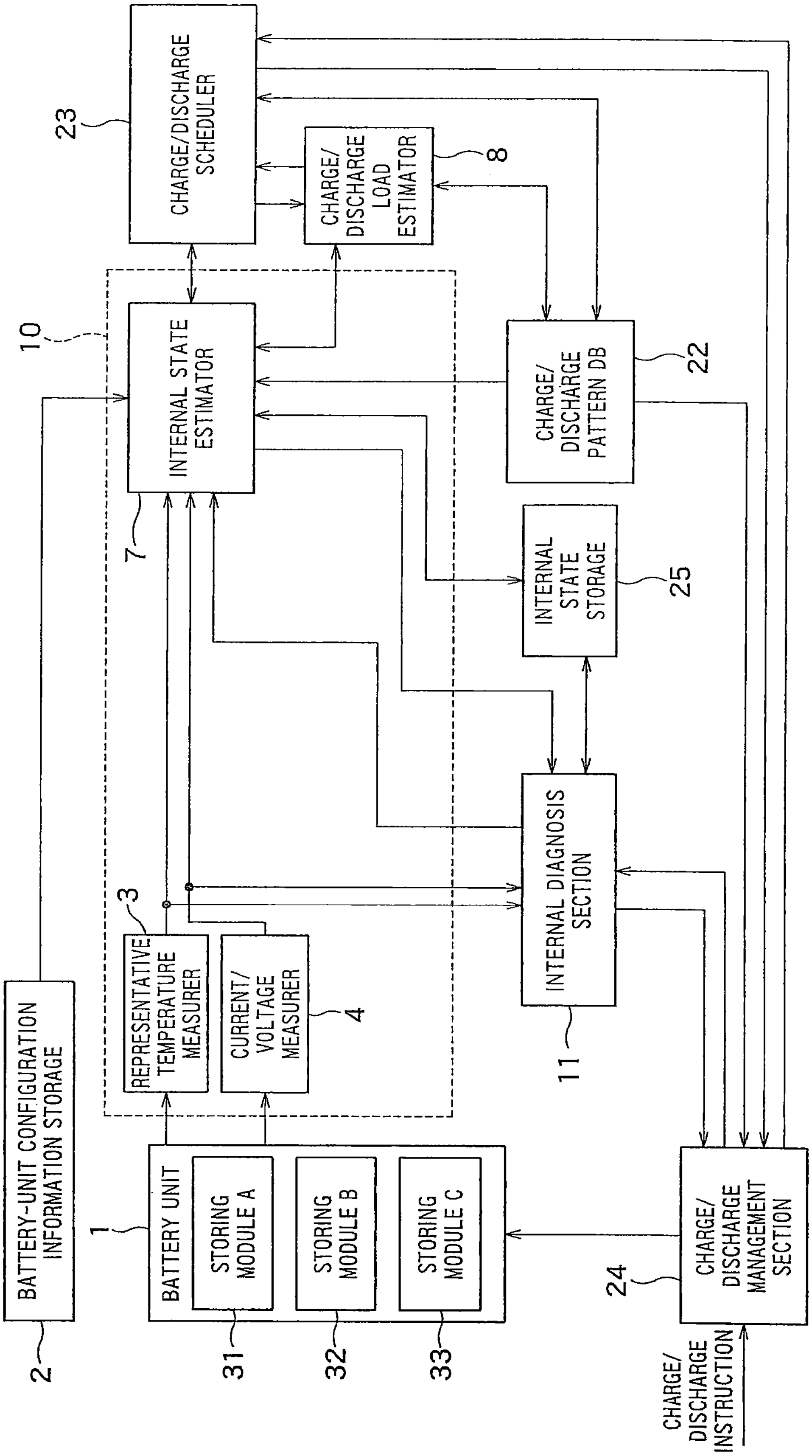
FIG. 10 is a diagram showing a configuration of a charge/discharge scheduling system according to a second embodiment.

FIG. 10 illustrates an example of a configuration of a charge/discharge scheduling system according to the second embodiment.

The battery unit 1 includes a plurality of storing modules; i.e. a storing module A31, a storing module B32 and a storing module C33. Each of the storing modules includes a plurality of battery cells as shown in FIG. 4. The representative temperature measurer 3 individually measures a representative temperature of each storing module. The current/voltage measurer 4 individually measures the current and the voltage at each of the storing modules.

With this, the internal state estimator 7 estimates the SOC and the internal resistance of each storing module, and the internal temperature-rise estimator 21 (refer to FIG. 3) estimates a representative internal temperature of each storing module.

The charge/discharge load estimator 8 calculates a load amount when the charge/discharge is made in a charge/discharge pattern using the formula A for each storing module. The charge/discharge scheduler 23 determines that, when the charge/discharge is made by using which storing module and which charge/discharge pattern, the load applied to the battery unit 1 is the smallest and selects a storing module to be charged/discharged and a charge/discharge pattern.

In the case of the configuration shown in FIG. 10, the load calculation formulas are as shown below:

$$\text{Load amount ``}LaA\text{'' of storing module } A = \sum_n \text{Ln} \times (\text{rest-period in temperature range ``}n\text{''}) \quad \text{Formula B}$$

$$\#1 \text{ (rest-period in temperature range ``}n\text{'')}$$

$$\text{Load amount ``}LaB\text{'' of storing module } B = \sum_n \text{Ln} \times (\text{rest-period in temperature range ``}n\text{''}) \quad \text{Formula C}$$

$$\#1 \text{ (rest-period in temperature range ``}n\text{'')}$$

$$\text{Load amount ``}LaC\text{'' of storing module } C = \sum_n \text{Ln} \times (\text{rest-period in temperature range ``}n\text{''}) \quad \text{Formula D}$$

$$\#1 \text{ (rest-period in temperature range ``}n\text{'')}$$

Load amount "LaS" of the battery unit 1=LaA+LaB+LaC

Figure 11:
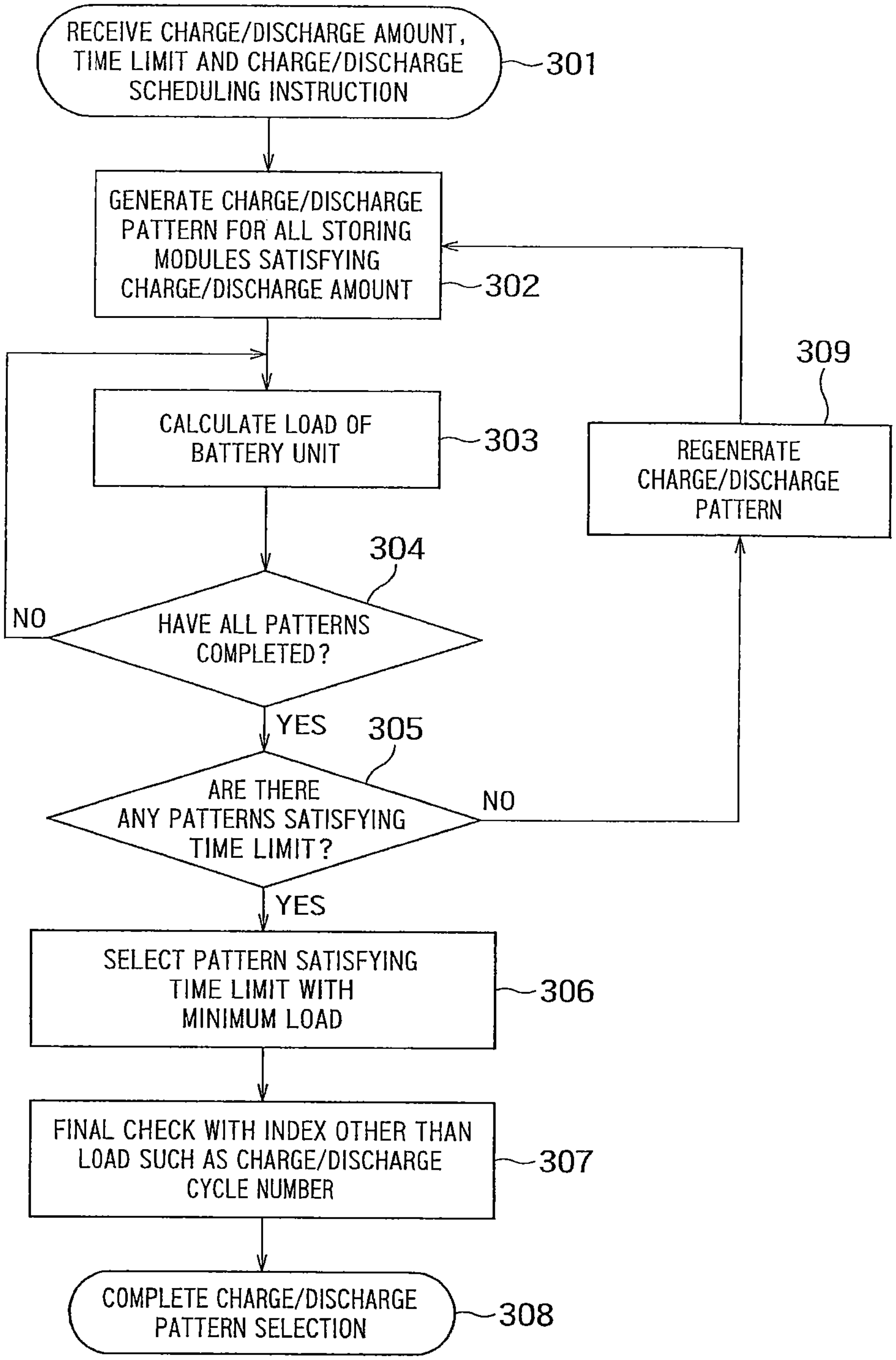
FIG. 11 is a diagram showing an example of a processing flow made by a charge/discharge scheduler for a battery unit including a plurality of storing modules according to the second embodiment.
Figure 12:
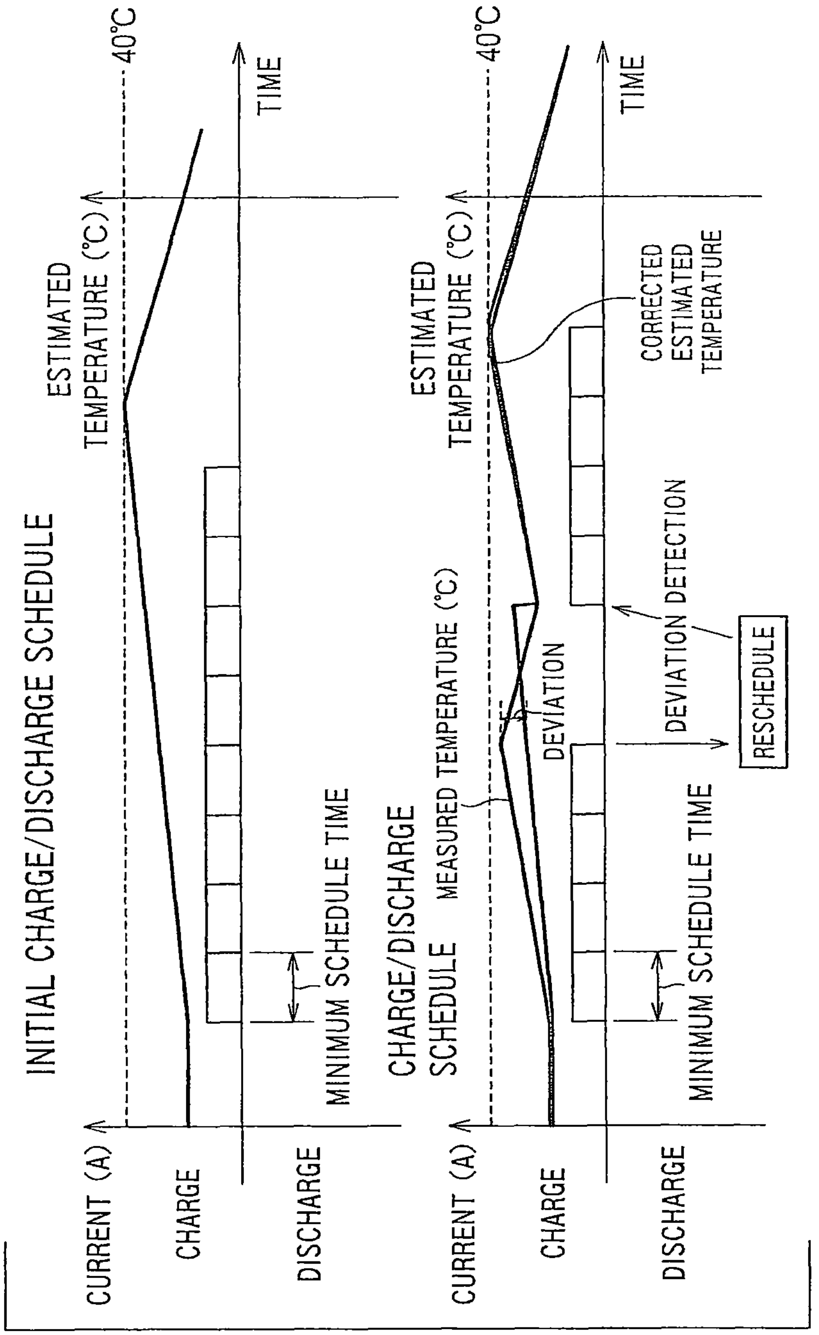
FIG. 12 is a diagram showing a relation among estimated temperature, measured temperature and recreated charge/discharge schedule according to a third embodiment.

FIG. 11 illustrates a processing flow according to the second embodiment. A charge/discharge pattern which satisfies a specified charge/discharge amount is generated for each storing module (step 302). In step 306, a charge/discharge schedule and a storing module with the smallest load are selected. Other steps 301, 303-305, 307 and 308 are the same as the steps 201, 203-205, 207, 208 of the flow in the first embodiment (FIG. 8).

<Example of Generating Method of Charge/Discharge Pattern for Assembled Battery>

First, a storing module which is possible to be charged/discharged is searched based on the charge/discharge amount and the charge/discharge capacity of each storing module. When a storing module which is possible to be charged/discharged is selected, the charge/discharge is made on the storing module. When a storing module which is possible to be charged/discharged is not selected, the charge/discharge amount is divided into two parts of the charge/discharge amount. And two storing module which are possible to be charged/discharged with two divided charge/discharge amount are searched. When two storing modules which are possible to be charged/discharged with the two divided charge/discharge amount are found, the two storing modules are selected, and the charge/discharge is made. When one storing module which is possible to be charged/discharged with one divided charge/discharge amount is found, the one storing module is selected. As for the remaining one charge/discharge amount, the charge/discharge amount is further divided into two parts of the charge/discharge amount, and a storing module which is possible to be charged/discharged with further divided charge/discharge amount is searched. Thus, the search is repeated until the entire charge/discharge amount is allotted to the storing modules which are possible to be charged/discharged with the charge/discharge amount.

After allotting the charge/discharge amount to each storing module in this manner, a charge/discharge pattern is generated and each load amount is calculated same as the case where the battery unit 1 is constituted of one storing module.

To make uniform charge/discharge, the following method may be employed. That is, in order to distribute the power of charge/discharge to M of storing modules, the charge/discharge amount is divided into M parts of charge/discharge amount first. M storing modules the charge/discharge capacity of which matches with the M-divided charge/discharge amount are selected based on the SOC of each of the plurality of storing modules. A charge/discharge pattern of M-divided charge/discharge amount is created for each of the selected storing modules.

Figure 17:
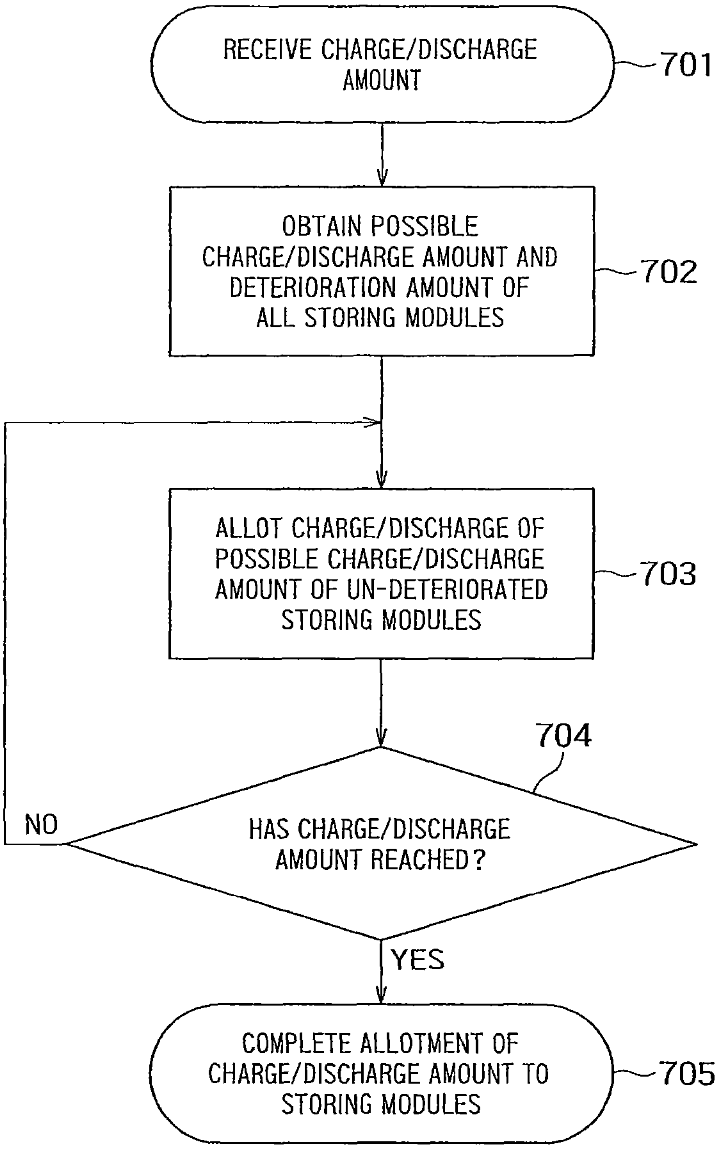
FIG. 17 is a diagram showing an example of a processing flow made by a charge/discharge scheduler for a battery unit including a plurality of storing modules.

Also, the following configuration may be employed. That is, a piece of information on the charge/discharge amount, the charge/discharge capacity of each storing module and deterioration level of each storing module is obtained; the storing modules sequentially selected from storing modules which are lesser deteriorated; and charge/discharge amount corresponding to the charge/discharge capacity of each storing module is allotted thereto. Here, as for the deterioration level of each storing module, internal diagnosis section 11 receives the deterioration amount which is obtained by the internal diagnosis section 11 using the method <Continuous diagnosis of deterioration amount of the battery unit> according to the first embodiment, and notifies the charge/discharge management section 24. The charge/discharge management section 24 determines the charge/discharge amount to the storing module; and then an instruction to create a charge/discharge schedule is given to the charge/discharge scheduler 23 in the same manner as the first embodiment. FIG. 17 illustrates the flow.

First, the charge/discharge management section 24 receives a charge/discharge instruction specifying the charge/discharge amount (step 701). An instruction is given to the internal diagnosis section 11 to obtain the charge/discharge capacity of each storing module and deterioration amount of each storing module from the internal state storage 25 (step 702). Subsequently, based on the deterioration amount, a comparison is made between the charge/discharge capacity and the charge/discharge amount, starting from a storing module which is less deteriorated. The charge/discharge amount is allotted to the storing modules which are less deteriorated (step 703). When the instructed charge/discharge amount can be allotted to a storing module which is least deteriorated with its charge/discharge capacity, the storing module to be charged/discharged are determined and storing module determination operation is terminated (step 705). Thus, an instruction is given to the charge/discharge scheduler 23 to create a charge/discharge schedule based on the charge/discharge amount. When instructed charge/discharge amount is not reached (step 704), a storing module which is deteriorated in secondly-level is selected. The comparison operation is repeated between the charge/discharge capacity and the remaining charge/discharge amount (step 703); and thus, the charge/discharge amount is sequentially allotted thereto.

Third Embodiment

Third embodiment is characterized in that the following function. That is, after determining a charge/discharge pattern, the temperature when performing actually the charge/discharge is measured. And when it is detected that the measured temperature is largely different from the estimated internal temperature, the charge/discharge operation is stopped or the charge/discharge schedule after that is changed and updated.

The block diagram of the system configuration of the third embodiment is the same as that shown in FIG. 1 and FIG. 10. According to the third embodiment, while the charge/discharge operation is made after creating a charge/discharge schedule of the battery unit 1 as described above, the internal diagnosis section 11 obtains a representative temperature from the representative temperature measurer 3, and obtains a internal estimated temperature which is conceivable from a created charge/discharge pattern and a present internal estimated temperature from the internal state estimator 7. When a deviation greater than a predetermined value is detected between the possible internal estimated temperature and the present internal estimated temperature, the internal diagnosis section 11 detects the deviation and notifies the charge/discharge management section 24, and the charge/discharge operation is stopped.

Or, an instruction is given to the internal state estimator 7 to reestimate the internal resistance or the SOC of the battery unit 1, or the internal resistance or SOC of the relevant storing module based on the measured present internal estimated temperature; and the charge/discharge schedule after the detection of the deviation is created again.

Fourth Embodiment

Figure 18:
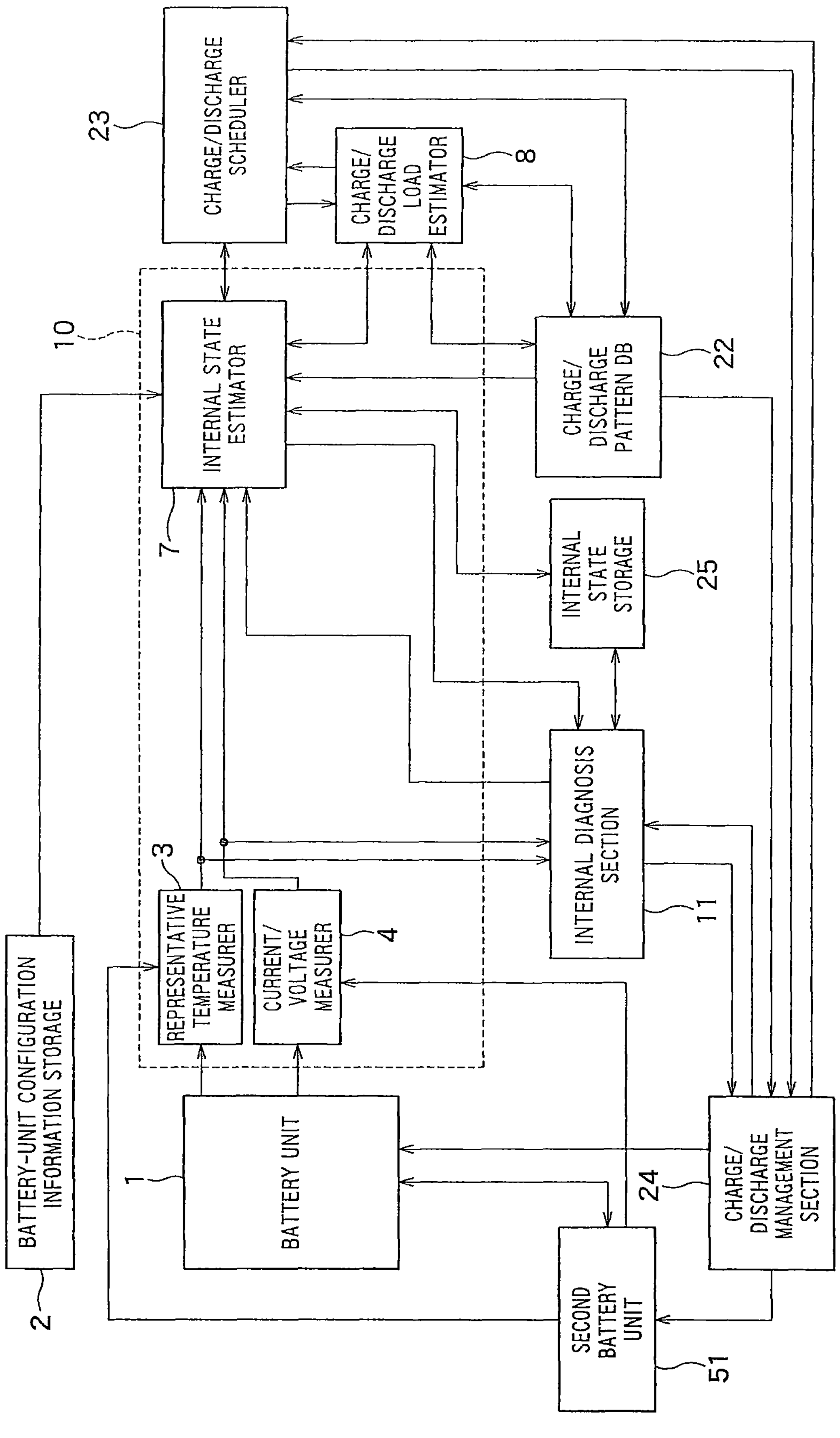
FIG. 18 is a diagram showing configuration of a charge/discharge scheduling system according to a fourth embodiment.

FIG. 18 illustrates a configuration of a system according a fourth embodiment. When the battery unit 1 performs the charge/discharge on a second battery unit 51, the charge/discharge management section 24 provides, after receiving an instruction on a charge/discharge amount and a time limit to the second battery unit 51, an instruction to create a charge/discharge schedule to the charge/discharge scheduler 23 in the same manner as the above-described embodiments.

The charge/discharge scheduler 23 obtains a piece of information on internal state of each of the battery unit 1 and the second battery unit 51 from the internal state estimator 7. When charging the second battery unit 51 with the power from the battery unit 1, the charge/discharge scheduler 23 calculates the load amount given by the identical current "i" to both of the battery unit 1 and the second battery unit 51 respectively by using the formula A. The charge/discharge scheduler 23 creates a schedule so the either one of the larger load amount in the load amounts applied to the battery unit 1 and to the second battery unit 51 becomes smaller. The scheduling operation is the same as that described in the first embodiment and the second embodiment.

In the case of charging the battery unit 1 with the power from the second battery unit 51 also, the charge/discharge scheduler 23 calculates the load amount given by the identical current "i" to each of the battery unit 1 and the second battery unit 51 by using the formula A. The charge/discharge scheduler 23 creates a schedule so the either one of the larger load amount in the load amounts to the battery unit 1 and to the second battery unit 51 becomes smaller.

The above description has been made by using mainly the case of charge. The case of discharge is also the same to the above.

The charge/discharge scheduling system as described above may also be realized using a general-purpose computer device as basic hardware. That is, each unit provided in the system can be realized by causing a processor mounted in the above described computer device to execute a program. In this case, the system may be realized by installing the above described program in the computer device beforehand or may be realized by storing the program in a storage medium such as a CD-ROM or distributing the above described program over a network and installing this program in the computer device as appropriate. Furthermore, each database in the system may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A charge/discharge scheduling system, comprising:

a temperature measurer configured to measure temperature of a battery unit;

a current/voltage measurer configured to measure a voltage and a current at the battery unit;

an internal resistance estimating unit configured to estimate an internal resistance of the battery unit;

a charge/discharge scheduler configured to create, based on a charge/discharge instruction specifying charge amount or discharge amount, a charging schedule for charging the battery unit with power of the charge amount or a discharging schedule for discharging power of the discharge amount from the battery unit;

a temperature estimating unit configured to estimate time-transition of temperature of the battery unit based on the internal resistance of the battery unit provided that the charge schedule or discharge schedule is carried out; and a load estimator configured to estimate a load amount applied to the battery unit based on the temperature time-transition of the battery unit provided that the charging schedule or the discharging schedule is carried out, wherein the charge/discharge scheduler creates the charge schedule or the discharge schedule so that the load amount applied to the battery unit is a minimum or smaller than a threshold value.

2. The system according to claim 1, further comprising a charge/discharge pattern database storing a plurality of charge patterns or a plurality of discharge patterns, wherein the charge/discharge scheduler selects a plurality of the charge patterns or the discharge patterns according to the charge amount or the discharge amount from the charge/discharge pattern database, calculates the load amount for each of the selected charge patterns or the selected discharge patterns and selects a charge pattern or a discharge pattern the load amount of which is a minimum or smaller than a threshold value as the charge schedule or the discharge schedule.

3. The system according to claim 1, further comprising a load index table prescribing a load applied to the battery unit per unit time for each of the plurality of temperatures, wherein the load estimator calculates a total load applied to the battery unit as the load amount based on the temperature time-transition estimated by the temperature estimating unit.

4. The system according to claim 1, wherein the load amount is maximum temperature included in the temperature time-transition of the battery unit, and the charge/discharge scheduler creates the charge schedule or the discharge schedule so that the maximum temperature is smaller than a threshold value.

5. The system according to claim 4, wherein the charge/discharge scheduler is configured so as, when the temperature of the battery unit estimated by the temperature estimating unit reaches a threshold value, to provide a break period to stop charge or discharge operation until a difference between the temperature of the battery unit estimated by the temperature estimating unit and the threshold value is larger than a predetermined value due to a natural heat release characteristic of the battery unit.

6. The system according to claim 1, further comprising a charge state estimator configured to estimate a state of charge of the battery unit, wherein the load estimator further estimates the load amount applied to the battery unit by using the state of charge of the battery unit.

7. The system according to claim 6, further comprising a load index table prescribing a load applied to the battery unit per unit time for each of a plurality of temperatures in each range of the charge state, wherein the load estimator calculates a total load applied to the battery unit as the load amount based on the state of charge of the battery unit and time-transition of the temperature of the battery unit.

8. The system according to claim 1, wherein the charge/discharge instruction includes a time limit of the charge or the discharge, and the charge/discharge scheduler creates the charge schedule or the discharge schedule so that the time limit is satisfied and the load amount is smaller than a threshold value, and when the charge schedule or the discharge schedule satisfying the time limit is not created, the charge/discharge scheduler re-creates the charge schedule or the discharge schedule by increasing a value of the threshold value.

9. The system according to claim 1, wherein the battery unit is a battery which includes a plurality of battery cells, the internal resistance estimating unit estimates the internal resistance of each of the battery cells, the temperature measurer measures the temperature of the battery unit by using a temperature sensor, the temperature estimating unit estimates the temperature time-transition in each of the battery cells based on a positional relation between the temperature sensor and the battery cells and internal resistances of the battery cells, the charging period or the discharging period includes a plurality of unit periods, the load estimator calculates a load amount applied to each of the battery cells within the unit period for each of the battery cells and each of the unit periods, and the charge/discharge scheduler obtains the load amount by selecting a maximum load amount in the load amounts of the battery cells in each of the unit periods and by adding each selected maximum load amount among the unit periods.

10. The system according to claim 1, wherein the battery unit is an assembled battery including a plurality of storing modules, the temperature measurer measures temperature of each of the storing modules, the current/voltage measurer measures current and voltage at each of the storing modules, the internal resistance estimating unit estimates an internal resistance in each of the storing modules, the temperature estimating unit estimates temperature time-transition of each of the storing modules, the load estimator calculates a load amount on each of the storing modules, and the charge/discharge scheduler selects a charged or discharged storing module among the plurality of storing modules and creates a charge schedule or a discharge schedule, so that the load amount of the charged or the discharged storing module is a minimum or smaller than a threshold value.

11. The system according to claim 1, further comprising a charge/discharge management section configured to control the charge/discharge of the battery unit based on the charge schedule or the discharge schedule created by the charge/discharge scheduler, the temperature measurer measures the temperature of the battery unit while the charge/discharge management section executes the charge schedule or the discharge schedule, and the charge/discharge management section stops the charge or the discharge of the battery unit when the temperature of the battery unit deviates by a predetermined value or more with respect to the temperature time-transition of the battery unit during the execution of the charge schedule or the discharge schedule.

12. The system according to claim 1, further comprising a charge/discharge management section configured to control the charge or the discharge of the battery unit by executing the charge schedule or the discharge schedule created by the charge/discharge scheduler, the temperature measurer measures the temperature of the battery unit while the charge/discharge management section executes the charge schedule or the discharge schedule, and when the temperature of the battery unit deviates by a predetermined value or more with respect to the temperature time-transition of the battery unit during the execution of the charge schedule or the discharge schedule, the charge/discharge management section re-calculates the internal resistance by using the internal resistance estimating unit and re-creates the charge schedule or the discharge schedule for a remaining part of the charge amount or the discharge amount specified by the charge/discharge instruction.

13. A charge/discharge scheduling method, comprising:

measuring temperature of a battery unit;

measuring a voltage and a current at the battery unit;

estimating an internal resistance of the battery unit;

creating, based on a charge/discharge instruction specifying charge amount or discharge amount, a charging schedule for charging the battery unit with power of the charge amount or a discharging schedule for discharging power of the discharge amount from the battery unit;

estimating time-transition of temperature of the battery unit based on the internal resistance of the battery unit provided that the charge schedule or discharge schedule is carried out; and estimating a load amount applied to the battery unit based on the temperature time-transition of the battery unit provided that the charging schedule or the discharging schedule is carried out, wherein the creating the charging schedule or the discharging schedule includes creating the charge schedule or the discharge schedule so that the load amount applied to the battery unit is a minimum or smaller than a threshold value.

* * * * *